(12) United States Patent
Naidu et al.

(10) Patent No.: US 10,761,052 B2
(45) Date of Patent: Sep. 1, 2020

(54) METHOD OF RECALIBRATING A DEVICE FOR ASSESSING CONCENTRATION OF AT LEAST ONE ANALYTE ION IN A LIQUID

(71) Applicant: CRC CARE PTY LTD, Mawson Lakes (AU)

(72) Inventors: Ravendra Naidu, New South Wales (AU); Liang Wang, New South Wales (AU); Zuliang Chen, South Australia (AU); Mallavarapu Megharaj, New South Wales (AU)

(73) Assignee: CRC CARE PTY LTD, Mawson Lakes (AU)

( * ) Notice: Subject to any disclaimer, the term of this patent is extended or adjusted under 35 U.S.C. 154(b) by 200 days.

(21) Appl. No.: 15/558,982

(22) PCT Filed: Mar. 9, 2016

(86) PCT No.: PCT/AU2016/050165
§ 371 (c)(1),
(2) Date: Sep. 15, 2017

(87) PCT Pub. No.: WO2016/145481
PCT Pub. Date: Sep. 22, 2016

(65) Prior Publication Data
US 2018/0246055 A1    Aug. 30, 2018

(30) Foreign Application Priority Data

Mar. 16, 2015 (AU) .................... 2015900933
Sep. 17, 2015 (AU) .................... 2015903799

(51) Int. Cl.
*G01N 27/26* (2006.01)
*G01N 27/416* (2006.01)
(Continued)

(52) U.S. Cl.
CPC ....... *G01N 27/4163* (2013.01); *G01N 27/333* (2013.01); *G06N 3/086* (2013.01)

(58) Field of Classification Search
CPC ... G01N 27/4163; G01N 27/333; G06N 3/086
(Continued)

(56) References Cited

U.S. PATENT DOCUMENTS 5,554,273 A    9/1996  Demmin et al.
2013/0304395 A1  11/2013  Naidu et al.

FOREIGN PATENT DOCUMENTS

WO    WO-2012/083371 A1    6/2012

OTHER PUBLICATIONS

Wang et al., "Application of mathematical models and genetic algorithm to simulate the response characteristics of an ion selective electrode array for system recalibration", Chemometrics and Intelligent Laboratory System 144 (2015) 24-30. (Year: 2015).*
(Continued)

*Primary Examiner* — Thanh Truc Trinh
(74) *Attorney, Agent, or Firm* — Edward D. Grieff; Mintz, Levin, Cohn, Ferris, Glovsky and Popeo, P.C.

(57) ABSTRACT

The present invention relates to a method of recalibrating a device for assessing concentration of at least one analyte ion in a liquid, the device having a plurality of ion selective electrodes (ISEs) generating a signal in response to sensing a selected ion in the liquid, and a data processing unit implementing a neural network algorithm that has been trained to calculate ion interference between the selected ion and other ions in the liquid sensed at one of the electrodes and/or electrode interference between ones of the electrodes sensing a same selected ion.

11 Claims, 11 Drawing Sheets

(51) Int. Cl.
*G01N 27/333* (2006.01)
*G06N 3/08* (2006.01)

(58) Field of Classification Search
USPC .......................................................... 205/789
See application file for complete search history.

(56) References Cited

OTHER PUBLICATIONS

Hartnett, Margaret, et al., "Potentiometric Nonlinear Multivariate Calibration with Genetic Algorithm and Simplex Optimization", *Analytical Chemistry*, American Chemical Society, May 15, 1997, vol. 69, No. 10, pp. 1909-1918.

Martinus, Bos, et al. "Data Processing by Neural Networks in Quantitative Chemical Analysis", ANALYST, vol. 118, Apr. 2, 1993 (Apr. 2, 1993), pp. 323-328.

Mueller, Amy V., et al. "Extended artificial neural networks: Incorporation of a priori chemical knowledge enables use of ion selective electrodes for in-situ measurement of ions at environmentally relevant levels", TALANTA, vol. 117, Sep. 4, 2013 (Sep. 4, 2013), pp. 112-118.

Supplementary European Search Report and European Search Opinion issued in European application No. EP 16764057.2, dated Sep. 26, 2018. 12 pages.

International Search Report issued in International Application No. PCT/AU2016/050165, dated Jun. 15, 2016. 3 pages.

Wang, Liang et. al. "Application of Mathematical Models and Genetic Algorithm to Simulate the Response Characteristics of an Ion Selective Electrode Array for System Recalibration." *Chemometrics and Intelligent Laboratory Systems*, vol. 144, 2015, pp. 1-28.

Wang, Liang et. al. "Application of Neural Networks with Novel Independent Component Analysis Methodologies for the Simultaneous Determination of Cadmium, Copper, and Lead Using an ISE Array." *Journal of Chemometrics*, vol. 28, 2014, pp. 1-8.

Wang, Liang et. al. "Application of Neural Networks with Novel Independent Component Analysis Methodologies to a Prussian Blue Modified Glassy Carbon Electrode Array." *Talanta*, vol. 131, 2015, pp. 395-403.

Written Opinion of the International Searching Authority issued in International Application No. PCT/AU2016/050165, completed Jun. 15, 2016. 8 pages.

* cited by examiner

METHOD OF RECALIBRATING A DEVICE FOR ASSESSING CONCENTRATION OF AT LEAST ONE ANALYTE ION IN A LIQUID

CROSS-REFERENCE TO RELATED APPLICATION SECTION

This application is a national-phase entry of Patent Cooperation Treaty Application No. PCT/AU2016/050165, which has an international filing date of Mar. 9, 2016, and claims the benefit of Australian Application Serial Nos. 2015900933, filed Mar. 16, 2015 and 2015903799, filed Sep. 17, 2015, the contents of which are incorporated by reference herein in their entirety.

TECHNICAL FIELD

The present invention relates to a method of recalibrating a device for assessing concentration of at least one analyte ion in a liquid.

BACKGROUND OF INVENTION

Ion Selective Electrodes (ISEs) are normally based on ionophores designed for complexing, interacting, and holding an analyte in a molecular cavity. These interactions are actually non-specific so that interference from other undesired analytes of a similar size and charge commonly appear. In the last decade, approaches using an ISE array with neural network algorithms, such as Back-Propagation Neural Network (BPNNs), to solve the problem of cross-interference between ISEs have been implemented. For example, a device, as described in the applicant's prior application PCT/AU2011/001663, for assessing concentration of analyte ions has been employed to attempt to simultaneously determine the major ions in environmental samples. However, in respect of this exemplary device, both the sensitivity and selectivity of the ISEs to the major selected ions gradually degrade over time. The entire content of PCT/AU2011/001663 is incorporated herein by way of reference.

It will be appreciated by those persons skilled in the art that "sensitivity" of the ISEs refers to each of the ISEs' sensitivity to the selected analyte ion in the sample and "selectivity" refers to the ability to determine the selected analyte ion in the sample when taking into consideration interference from the interfering ions in the sample.

In respect of the above mentioned exemplary prior art device, calibration attempts have been made to increase the sensitivity of the ISEs using, for instance, a calibrating sample of known ionic concentration to calibrate a previously built-up BPNN model for the ISEs. However, this calibration technique results in an inaccurate calibration of the ISEs' response as the ISEs' response to the other (e.g. interfering) ions in the sample is not considered. Further, it is not practical for users to calibrate (i.e. re-measure) the whole training data set for each of the ions, typically requiring dozens of calibrating samples, to re-build the BPNN model every time an elapsed period of time occurs between use of the device, which may occur due to say a long storage period of the device.

Reference to any prior art in this specification is not, and should not be taken as, an acknowledgment or any form of suggestion that this prior art forms part of the common general knowledge in any country.

SUMMARY OF INVENTION

Accordingly, one aspect of the present invention provides a method of recalibrating a device for assessing concentration of at least one analyte ion in a liquid, the device having: a plurality of ion selective electrodes (ISEs) each of which generate a signal in response to sensing a selected ion in the liquid; and a data processing unit implementing a neural network algorithm that has been trained to calculate ion interference between the selected ion and other ions in the liquid sensed at one of the electrodes and/or electrode interference between ones of the electrodes sensing a same selected ion based on a result of a comparison of training data indicative of known ionic concentrations applied to the neural network algorithm and the known ionic concentrations, the method includes: contacting, with the plurality of electrodes, more than one recalibrating sample having a first selected calibration ion and a first interference calibration ion of known ionic concentrations, respectively, for a first one of the plurality of electrodes and having a second selected calibration ion and a second interference calibration ion of known ionic concentrations, respectively, for a second one of the plurality of electrodes; and the data processing unit: receiving a signal from each of the electrodes in response to sensing an ionic concentration of the first and second selected calibration ions and the first and second interference calibration ions in the more than one recalibrating sample; simulating a response of each of the plurality of electrodes by applying the signal as recalibration training data to a recalibration algorithm that has been trained to simulate the response based on a comparison of the recalibration training data and the known ionic concentration of the first and second selected calibration ions and the first and second interference calibration ions; and recalibrating the device using output data from the recalibration algorithm as the training data of the neural network algorithm.

Preferably, the recalibration algorithm is a Genetic Algorithm (GA). It will be appreciated by those persons skilled in the art that the GAs' optimization principle relies on the biological theory of survival of the fittest that explains how genes on the chromosome vary by several biological means, such as chromosome encoding and decoding, selection for offspring, crossover and mutation to adapt to the particular environment etc.

In an embodiment, the method further includes simulating the response of the first electrode by simulating a first selected calibration ion potential response value of the first electrode caused by the first selected calibration ion and simulating an first interference calibration ion potential response difference value of the first electrode caused by the first interference calibration ion. The embodiment further includes simulating the first selected calibration ion potential response value includes determining a concentration of the first selected calibration ion in the more than one recalibration sample. Also, simulating the first interference calibration ion potential response value includes determining a concentration of the first interference calibration ion in the more than one recalibration sample.

Preferably, simulating the first selected calibration ion potential response value and simulating the first interference calibration ion potential response value includes determining said concentration of the first selected calibration ion and said concentration of the first interference calibration ion in four of said recalibration samples. That is, the recalibration algorithm simulates the response of the first electrode based on a comparison of the recalibration training data generated from measuring four standard samples and the known ionic concentration of the first and second selected calibration ions and the first and second interference calibration ions in the four standard samples. It will be appreciated by those persons skilled in the art that other number of samples can be used to simulate the response, such as 6.

It will be appreciated by those persons skilled in the art that each of the four recalibrating samples have known ionic concentrations of the first and second selected calibration ions and the first and second interference calibration ions, respectively. For example, see table 1 below.

In an embodiment, the method further includes simulating the response of the second electrode by simulating a second selected calibration ion potential response value of the second electrode caused by the second calibration ion and simulating a second interference calibration ion potential response difference value of the second electrode caused by the second interference calibration ion. The embodiment further includes simulating the second selected calibration ion potential response value includes determining a concentration of the second selected calibration ion in the more than one recalibration sample. Also, simulating the second interference calibration ion potential response value includes determining a concentration of the second interference calibration ion in the more than one recalibration sample.

Preferably, simulating the second selected calibration ion potential response value and simulating the second interference calibration ion potential response value includes determining said concentration of the second selected calibration ion and said concentration of the second interference calibration ion in four of said recalibration samples. That is, the recalibration algorithm simulates the response of the second electrode based on a comparison of the recalibration training data generated from measuring four standard samples and the known ionic concentration of the first and second selected calibration ions and the first and second interference calibration ions in the four standard samples. It will be appreciated by those persons skilled in the art that other number of samples can be used to simulate the response, such as 6.

In another embodiment, the more than one recalibrating sample is four recalibrating samples, each having known ionic concentrations of the first and second selected calibration ions and the first and second interference calibration ions, respectively.

Preferably, the first selected calibration ion is the second interference calibration ion and the second selected calibration ion is the first interference calibration ion. For example, the first selected calibration ion and the second interference calibration ion are NO3 ions and the second selected calibration ion and the first interference calibration ion are Cl ions.

In an embodiment, simulating the response at the first and the second electrodes can be expressed as:

$$V_{ISE_{SEL}} = V_{pC_{SEL}} + \Delta V_{pC_{INT}} = P_1 * pSEL + P_2 + P_3 * e^{P_4*(pSEL-pINT)}$$

where:
$V_{ISE_{SEL}}$=the potential response value of the first electrode for sensing the first or the second selected calibration ion;
$V_{pC_{SEL}}$=the potential value of the first electrode caused by the first or the second selected calibration ion;
$\Delta V_{pC_{INT}}$=the potential difference value of the first electrode caused by the first or the second interference calibration ion;
pSEL=the concentration of the first or the second selected calibration ion (unit: –lg M);
pINT=the concentration of the first or the second interference calibration ion (unit: –lg M); and
$P_1$, $P_2$, $P_3$ and $P_4$=parameters to be determined In an embodiment, the method includes recalibration algorithm determining and optimising the parameters $P_1$, $P_2$, $P_3$ and $P_4$ based on the known ionic concentrations of the first and/or the second selected calibration ion and the first and/or the second interference calibration ion in the more than one recalibration sample. Specifically, the parameters $P_1$ and $P_2$ are determined based on various ionic concentrations of the first or the second interference ions in the more than one recalibration sample with a constant ionic concentration of the first or the selected calibration ions, respectively. Also, the parameters $P_3$ and $P_4$ are determined based on the known ionic concentrations of the first or the second selected ions in the more than one recalibration sample.

Preferably, the method further includes determining and optimising the parameters $P_1$, $P_2$, $P_3$ and $P_4$ by applying the above mentioned Genetic Algorithm to the parameters $P_1$, $P_2$, $P_3$ and $P_4$.

In an embodiment, simulating the response at the first electrode for NO3 ions can be expressed as:

$$V_{ISE_{NO_3}} = V_{pC_{NO_3}} + \Delta V_{pC_{Cl}}$$
$$= P_1 * pNO_3 + P_2 + P_3 * e^{P_4*(pNO_3-pCl)}$$

where:

$V_{ISE_{NO_3}}$ = the potential response value of the first electrode for sensing the NO$_3$ ion;

$V_{pC_{NO_3}}$ = the potential value of the first electrode caused by the NO$_3$ ion;

$\Delta V_{pC_{Cl}}$=the potential difference value of the first electrode caused by the Cl ion;
pNO$_3$=the concentration of the NO$_3$ ion (unit: –lg M);
pCl=the concentration of the Cl ion (unit: –lg M); and
$P_1$, $P_2$, $P_3$ and $P_4$=parameters to be determined In the embodiment, simulating the response at the first electrode for NO3 ions can be expressed as:

$$V_{ISE_{NO_3}} = 35.7 * pNO_3 + 246.8 + 0.16 * e^{1.35*(pNO_3-pCl)}$$

In an embodiment, simulating the response at the second electrode for Cl ions can be expressed as:

$$V_{ISE_{Cl}} = V_{pC_{NO_3}} + \Delta V_{pC_{Cl}}$$
$$= P_1 * pNO_3 + P_2 + P_3 * e^{P_4*(pNO_3-pCl)}$$

where:
$V_{ISE_{Cl}}$=the potential response value of the second electrode for sensing the Cl ion;
$V_{pC_{Cl}}$=the potential value of the second electrode caused by the Cl ion;

$\Delta V_{pC_{NO_3}}$ = the potential difference value of the second electrode caused by the NO$_3$ ion;

pNO$_3$=the concentration of the NO$_3$ ion (unit: –lg M);

pCl=the concentration of the Cl ion (unit: −lg M); and
$P_1$, $P_2$, $P_3$ and $P_4$=parameters to be determined In the embodiment, simulating the response at the second electrode for Cl ions can be expressed as:

$$V_{ISE_{Cl}} = 37.8*pCl + 274.2 + 0.2*e^{2.3*(pCl-pNO_3)}$$

Preferably, the mathematical equations are developed to describe the characteristics of the ISE's response, which are not only based on the response of the ISE to their related ion, but also to that of the interfering ion. The developed mathematical equations can be used to simulate the response values of the array of ISEs, and to determine the concentrations of analyte ions from unknown samples.

As described, the parameters in the equations are optimized using a Genetic Algorithm (GA). The parameters are optimised to match the response characteristics of the ISE array. The parameters' values in the equations are adjustable following the degradation of the sensitivity and selectivity of the ISEs. By using the equations, it is possible to measure only a couple of selected standard solutions to calculate the parameters in order to recalibrate the ISE array system for determination. That is, instead of using the neural network algorithm, such as the exemplary BPNN, the mathematical equations of the recalibration algorithm are used to simulate the characteristics of the ISE array's response, including the sensitivity and selectivity. The mathematical equations of the recalibration algorithm can be used to simulate the response values of ISE array, and to determine the analyte ions' concentrations from unknown samples. By measuring only a couple of standard solutions, which is practical to the end users, the ISE array can be automatically recalibrated using the recalibration algorithm implementing Genetic Algorithm (GA).

In an embodiment, the ISEs are an array of Prussian blue modified Carbon Paste Electrodes (PB-CPE). In an embodiment of the device in use, the PB-CPE ISEs form an Electronic Tongue (ET), which is an artificial taste system created from response signals from an array of sensors. It will be appreciated by those persons skilled in the art that the above neural network algorithm is an example of a pattern recognition algorithm or technique which, in this case, is used to improve prediction accuracy in, for example, the foodstuff industry and for environmental assessments. In one arrangement, for instance, the pattern recognition technique has been developed to improve the pattern recognition accuracy of Electronic Tongue (ET) systems.

Using input data from the ISE array, the above device is able to avoid interference from undesired ions to offer high prediction accuracy and simultaneously determine multiple free ions in water samples. Furthermore, the Electronic Tongue system can be used for online in situ assessment of water quality and can be employed as a real time nutrient monitoring system for analysis of irrigation water quality for agronomy and horticulture. As described, however, ET systems for agronomy and horticulture may not be used for a significant period of time which degrades the sensitivity and selectivity of the ISE array.

In an embodiment, the sensor electrode arrays in an ET system contain a variety of different working and reference electrodes and either the differences in potential or current between reference and working electrodes are utilized as data for the pattern recognition techniques. As above, the device is particularly suitable for assessing the concentration of at least one analyte ion in a liquid including a mixture of ions. As the neural network compensates for ion interference and/or electrode interference, the, device allows one or more ions to be accurately assessed even in the presence of other ions.

According to another aspect of the present invention, there is provided a method of recalibrating a device for assessing concentration of at least one analyte ion in a liquid, the device having: a plurality of ion selective electrodes (ISEs) each of which generate a signal in response to sensing a selected ion in the liquid; and a data processing unit implementing a neural network algorithm that has been trained to calculate ion interference between the selected ion and other ions in the liquid sensed at one of the electrodes and/or electrode interference between ones of the electrodes sensing a same selected ion based on a result of a comparison of training data indicative of known ionic concentrations applied to the neural network algorithm and the known ionic concentrations, the method includes: contacting, with the plurality of electrodes, more than one recalibrating sample having n selected calibration ions and a plurality of interference calibration ions of known ionic concentrations, respectively, whereby each of the n selected calibration ions correspond to ones of the plurality of electrodes; and the data processing unit: receiving a signal from each of the electrodes in response to sensing an ionic concentration of a corresponding one of the n selected calibration ions and the plurality of interference calibration ions in the more than one recalibrating sample; simulating a response of each of the plurality of electrodes by applying the signal as recalibration training data to a recalibration algorithm that has been trained to simulate the response based on a comparison of the recalibration training data and the known ionic concentration of the n selected calibration ions and the plurality of interference calibration ions; and recalibrating the device using output data from the recalibration algorithm as the training data of the neural network algorithm.

In an embodiment, the method further includes simulating the response of a first electrode in the plurality of electrodes by simulating a first selected calibration ion potential response value of the first electrode caused by the first selected calibration ion and simulating a first interference calibration ion potential response difference value of the first electrode caused by the plurality of interference calibration ions. Furthermore, in the embodiment, simulating the first selected calibration ion potential response value includes determining a concentration of the first selected calibration ion in the more than one recalibration sample and simulating the first interference calibration ion potential response value includes determining a concentration of each of the plurality of interference calibration ions in the more than one recalibration sample.

Preferably, in this embodiment, there are five recalibration samples, and simulating the first selected calibration ion potential response value and simulating the first interference calibration ion potential response value includes determining the concentration of the first selected calibration ion and the concentration of the plurality of interference calibration ions in five recalibration samples.

In an embodiment, the method further includes simulating the response of a second electrode in the plurality of electrodes by simulating a second selected calibration ion potential response value of the second electrode caused by the second calibration ion and simulating a second interference calibration ion potential response difference value of the second electrode caused by the plurality of interference calibration ions. Furthermore, in the embodiment, simulating the second selected calibration ion potential response value includes determining a concentration of the second selected calibration ion in the more than one recalibration sample and simulating the second interference calibration ion potential response value includes determining a concentration of the plurality of interference calibration ions in the more than one recalibration sample.

Preferably, in this embodiment also, there are five recalibration samples, and simulating the second selected calibration ion potential response value and simulating the second interference calibration ion potential response value includes determining the concentration of the second selected calibration ion and the concentration of the plurality of interference calibration ions in five recalibration samples.

In an embodiment, the n selected calibration ions of known ionic concentration are four selected calibration ions which correspond to four of the plurality of electrodes. Also, the plurality of interference calibration ions includes the four selected calibration ions, which include: Sodium (Na), Potassium (K), Calcium (Ca) and Magnesium (Mg) ions. It will be appreciated by those persons skilled in the art that other calibration ions are envisaged for use in the recalibration of the device.

In an embodiment, simulating the response at each of the plurality of electrodes can be expressed as:

$$V_{ISE} = V_{pC_{Selected}} + \sum_{i=1}^{n} \Delta V_{pC_{Selected} - pC_{Interferon_i}}$$

$$V_{ISE} \approx a \times pC_{Selected} + b + \sum_{i=1}^{n} c_i \times e^{d_i \times (pC_{Selected} - pC_{Interferon_i})}$$

Where:
$V_{ISE}$—the potential response value of the first electrode (ISE) (Unit: mV);
$VpC_{Selected}$—the potential value caused by the first selected calibration ion (Unit: mV);
$\Delta V$—the potential difference of each one of the plurality of electrodes ISE's response caused by each of the plurality of interference calibration ions (Unit: mV);
$pC_{selected}$—the concentration of the first selected calibration ion (Unit: –Ig M);
$pC_{Interferon_i}$—the concentration of the $i^{th}$ one of the interference calibration ions (Unit: –Ig M); and
a, b, $c_i$ and $d_i$—the parameters for the $i^{th}$ one of the interference calibration ions to be determined.

In this embodiment, the method further includes the recalibration algorithm determining and optimising the parameters a, b, $c_i$ and $d_i$ based on the known ionic concentrations of the n selected calibration ions and the plurality of interference calibration ions in the more than one recalibration sample. Specifically, the parameters a and b are determined based on various ionic concentrations of the n selected calibration ions and the plurality of interference ions in the more than one recalibration sample, respectively, and the parameters $c_i$ and $d_i$ are determined based on various ionic concentrations of the plurality of interference ions in the more than one recalibration sample with constant ionic concentrations of the n selected calibration ions, respectively.

As described above, the parameters in the latter equations are also optimized using a Genetic Algorithm (GA) and the recalibration algorithm is a Genetic Algorithm.

BRIEF DESCRIPTION OF DRAWINGS

In order that the invention can be more clearly understood, examples of embodiments will now be described with reference to the accompanying drawings, in which.

DETAILED DESCRIPTION

Figure 1:
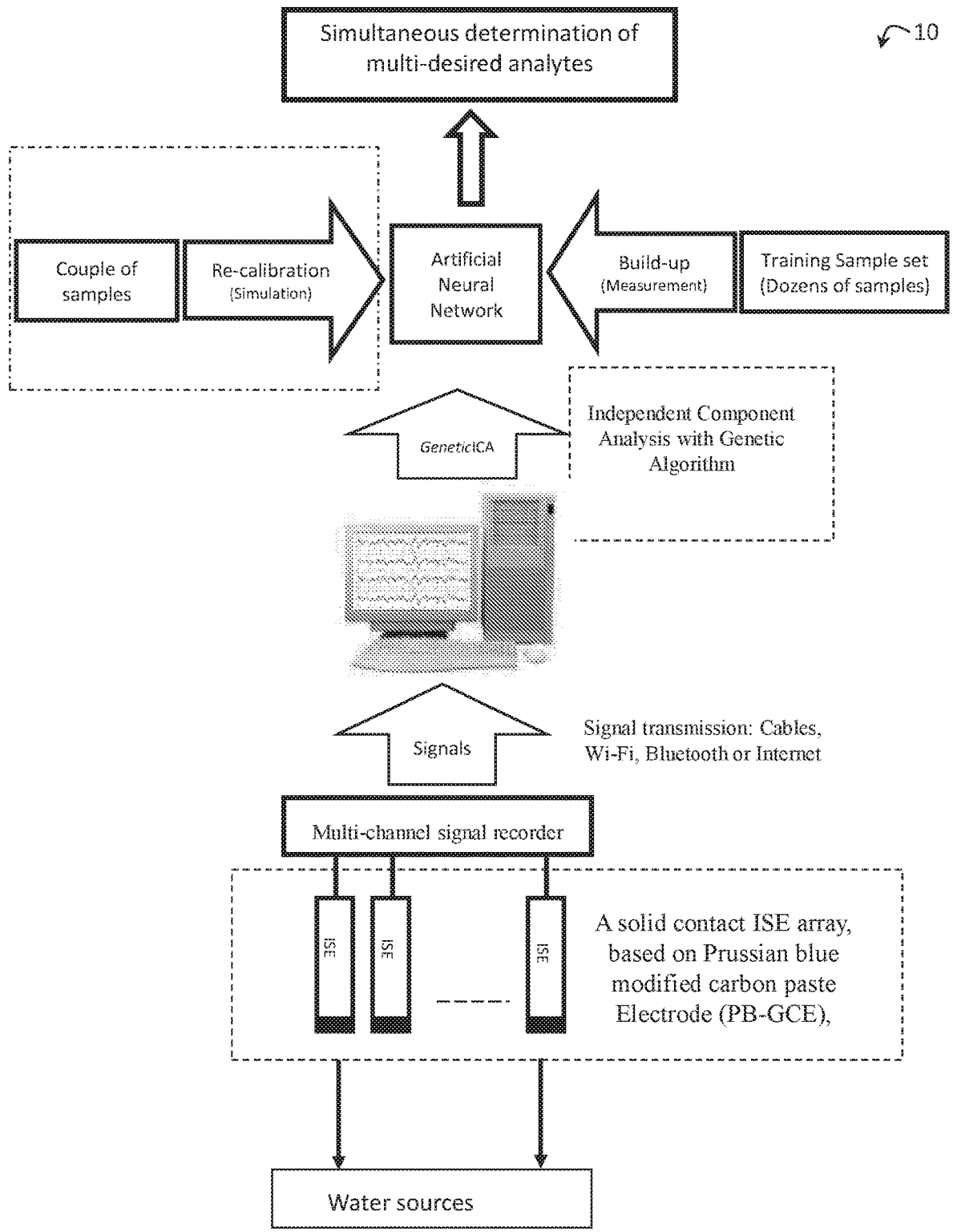
FIG. 1 shows a block diagram of a method of recalibrating a device for assessing concentration of at least one analyte ion in a liquid, according to an embodiment of the invention.
Figure 6:
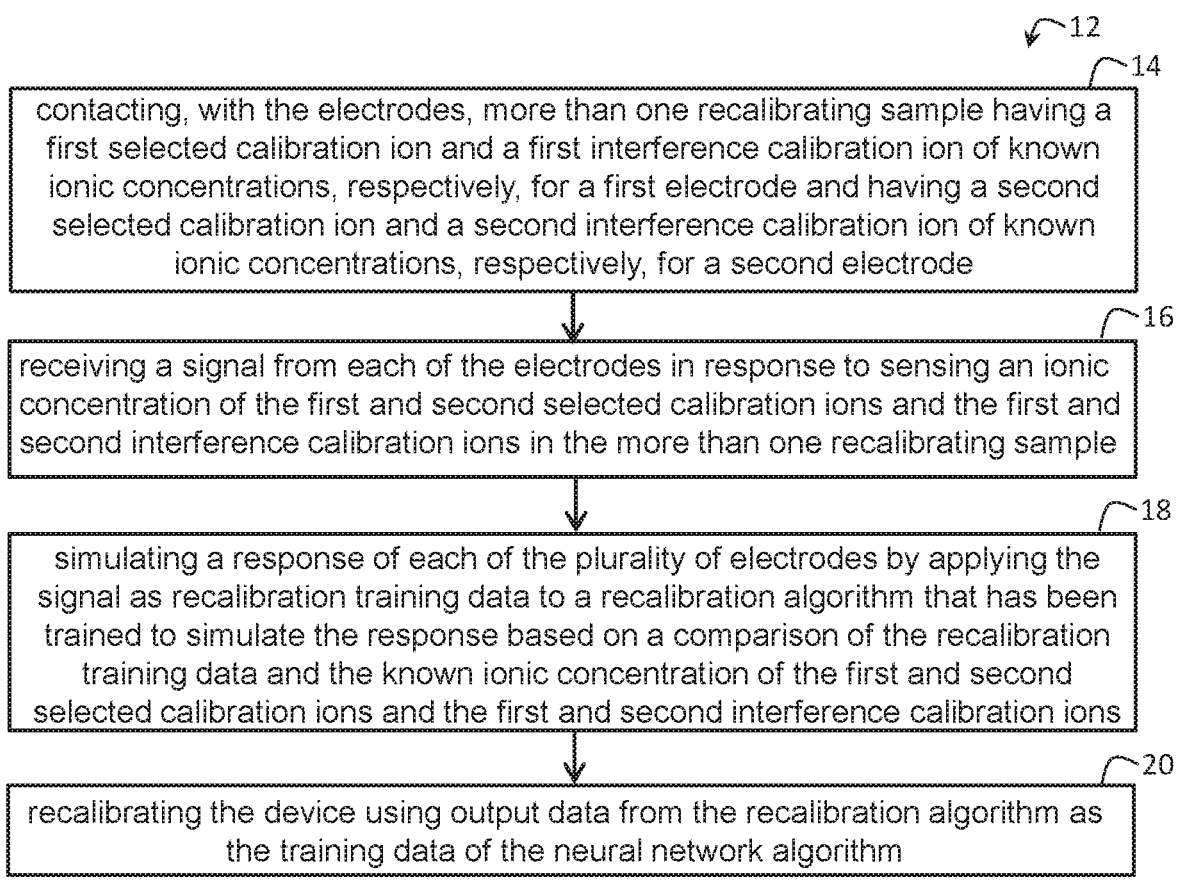
FIG. 6 is a flow chart of a method of recalibrating a device for assessing concentration of at least one analyte ion in a liquid, according to an embodiment of the invention.

According to an embodiment of the present invention there is provided a method of recalibrating a device for assessing concentration of at least one analyte ion in a liquid, as shown in FIGS. 1 and 6. FIG. 1 shows a block diagram 10 of the device for assessing the concentration of at least one analyte ion in a liquid in more detail. The device includes a plurality of ion selective electrodes (ISEs) each of which generate a signal in response to sensing a selected ion in a liquid, and a multi-channel signal recorder that send signals to a data processing unit. The data processing unit implements a neural network algorithm that has been trained to calculate ion interference between the selected ion and other ions in the liquid sensed at one of the electrodes and/or electrode interference between ones of the electrodes sensing a same selected ion based on a result of a comparison of training data indicative of known ionic concentrations applied to the neural network algorithm and the known ionic concentrations. In use, the device compensates for ion interference and/or electrode interference and assesses the concentration of the analyte ions in the liquid on the basis of a compensated output from the neural network algorithm In the embodiment, the method 12 shown in FIG. 6 for recalibrating the device includes the steps of: contacting 14, with the plurality of electrodes, more than one recalibrating sample having a first selected calibration ion and a first interference calibration ion of known ionic concentrations, respectively, for a first one of the plurality of electrodes and having a second selected calibration ion and a second interference calibration ion of known ionic concentrations, respectively, for a second one of the plurality of electrodes. The data processing unit of the embodiment is further configured for: receiving 16 a signal from each of the electrodes in response to sensing an ionic concentration of the first and second selected calibration ions and the first and second interference calibration ions in the more than one recalibrating sample; simulating 18 a response of each of the plurality of electrodes by applying the signal as recalibration training data to a recalibration algorithm that has been trained to simulate the response based on a comparison of the recalibration training data and the known ionic concentration of the first and second selected calibration ions and the first and second interference calibration ions; and recalibrating 20 the device using output data from the recalibration algorithm as the training data of the neural network algorithm.

In an embodiment, the ISEs of the device of FIG. 1 are an array of solid state electrodes comprising Prussian Blue modified Carbon Paste Electrodes (PB-CPE).

Figure 2A:
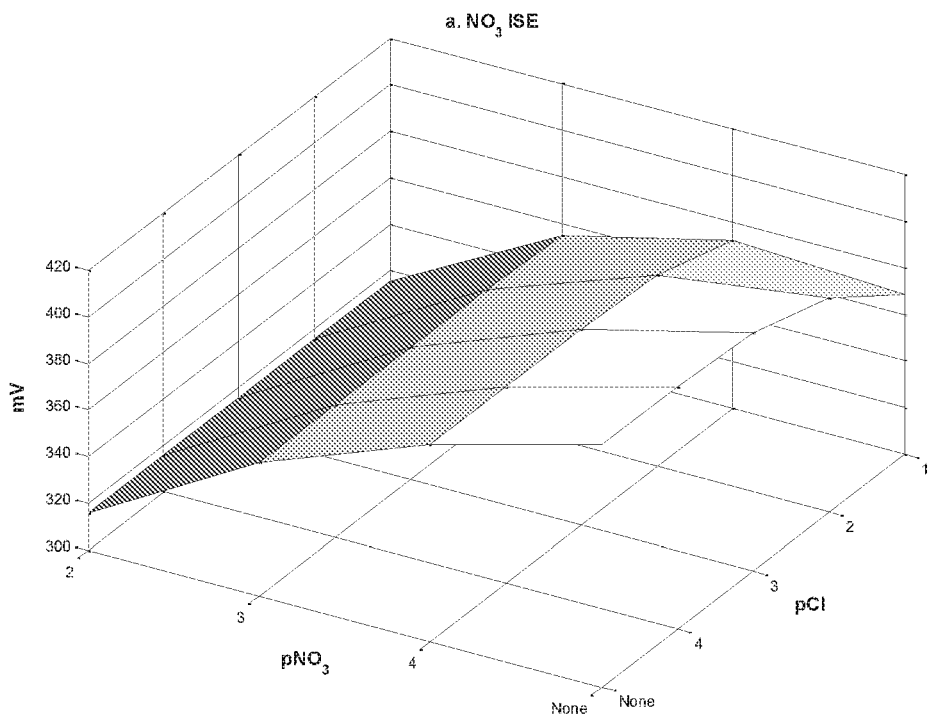
FIG. 2A shows interference characteristics of an ISE of the device configured to simulate a response value to sensing a $NO_3$ ion in a recalibration sample, according to an embodiment of the invention.
Figure 2B:
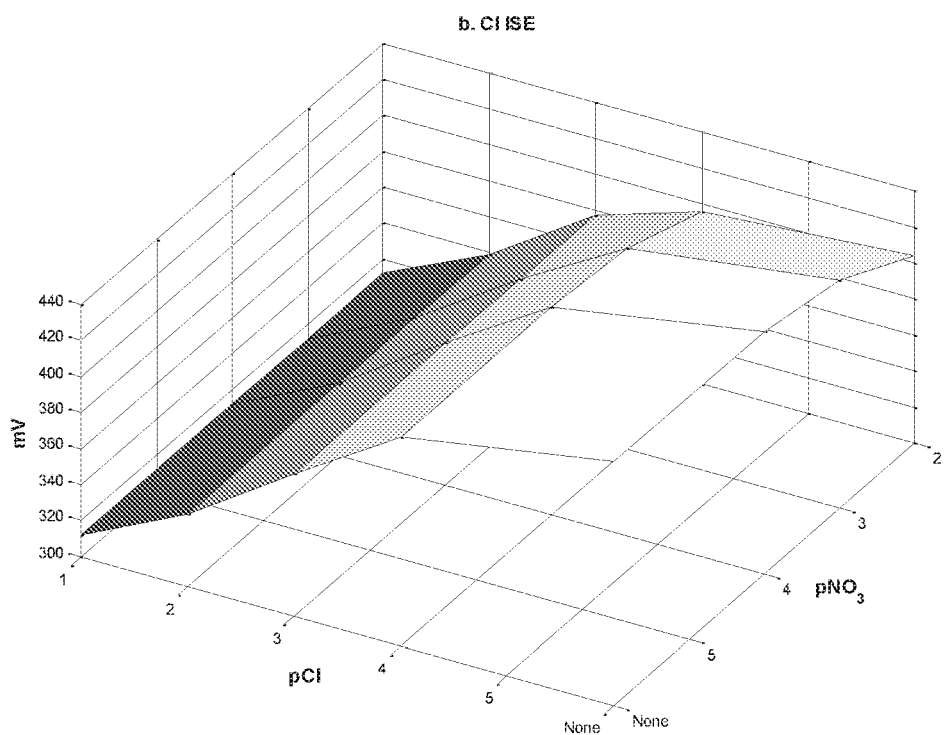
FIG. 2B shows interference characteristics of an ISE of the device configured to simulate a response value to sensing a Cl ion in a recalibration sample, according to an embodiment of the invention.

In relation to FIGS. 2A and 2B, the recalibrating samples contacted against the PB-CPEs have $NO_3$ and Cl ions of known ionic concentrations. FIG. 2A shows the plurality of electrodes being applied to determine $NO_3$ concentrations in the presence of Cl and FIG. 2B shows the plurality of electrodes being applied to determine Cl concentrations in the presence of $NO_3$. That is, the ISEs of the embodiment are used to sense Cl and $NO_3$ concentrations in the presence of cross-interference to perform the method of recalibration. Table 1 below shows the known concentration of four recalibration samples.

TABLE 1

Four standard solutions for re-calibration

| Solution | $KNO_3$ (mM) | NaCl (mM) | $NO_3$ ISE $P_1$ & $P_2$ Eq. (1) | $NO_3$ ISE $P_3$ & $P_4$ Eq. (2) | Cl ISE $P_1$ & $P_2$ Eq. (1) | Cl ISE $P_3$ & $P_4$ Eq. (3) |
|---|---|---|---|---|---|---|
| 1 | 0 | 0 | | | ✓ | |
| 2 | 0 | 100 | | ✓ | ✓ | |
| 3 | 0.1 | 0.1 | ✓ | | ✓ | ✓ |
| 4 | 10 | 0.1 | ✓ | | | ✓ |

It will be appreciated by those persons skilled in the art that Prussian blue (PB) electrodes or, alternatively, iron (III) hexacyanoferrate (II) electrodes are an inorganic polycrystal with well-known electrochromic and electrocatalytical capabilities. Mixing PB with graphite powder to prepare Carbon Paste (CP) is a cheap, simple and effective mixing technique to create the electrode body. Also, $NO_3$ ions are found in common nitrogenous compounds that result from the natural processes of the nitrogen cycle. However, anthropogenic sources, such as fertilizers and detergents, have greatly increased their nitrate concentrations in potable water supplies, particularly groundwater. Chloride (Cl) is a major anionic constituent of surface and groundwater, and concentrations vary widely between water. Therefore, in an example, understanding the co-relationship between the ISEs and ions of Cl and $NO_3$ can improve the accuracy of predicting these two ions for monitoring water quality.

In the present application, the characteristics of both $NO_3$ ISE and Cl ISE have been described mathematically. 30 different soil leachate samples collected from three different states in Australia were used for validation to demonstrate that Cl and $NO_3$ can be simultaneously and accurately determined using the recalibration algorithm.

For making the PB-CPE body, Iron (III) ferrocyanide powder (e.g. Sigma-Aldrich) was mixed with Graphite powder (e.g. Aldrich) in a 1:9 ratio by weight. This powder mixture was transferred to an agate mortar and mixed thoroughly for 5 minutes with 20 wt. % mineral oil (e.g. Sigma-Aldrich). The homogeneous paste was placed in the electrode holders, which were made from 10-100 µL pipette tips (e.g. Sigma-Aldrich), connected with a copper cable and sealed with epoxy (e.g. Araldite). The electrode paste surface was smoothed onto a glass plate. The geometric diameter of the electrode surface was 5 mm. The ISE array contained an Ag/AgCl reference electrode and 2 PB-CPEs. The ion-sensitive membranes were prepared by adding a solution (30 µL) drop-wise of the formulation which consisted of: chloride-selective membrane: 2.0 wt. % of chloride ionophore (ETH 9009, Fluka), 0.05 wt. % of ionic additive (TDMACl, Fluka), 64.95 wt. % of plasticizer (Bis(2-ethylhexyl) sebacate, Fluka) and 33 wt. % of PVC (Fluka); nitrate-selective membrane: 1.0 wt. % of nitrate ionophore (Nitrate Ionophore V, Fluka), 0.6 wt. % of ionic additive (TDMACl, Fluka), 65.6 wt. % of plasticizer (oN-OPE, Fluka) and 32.8 wt. % of PVC (Fluka) [25]. 400 mg of these chemicals were mixed into 3 mL of tetrahydrofuran (THF, from Fluka).

All reagents employed were of analytical grade and used directly without further purification, unless otherwise stated. Deionized water (Milli Q plus System, Millipore, Bedford, Mass. USA, with resistivity of 18.2 MΩ $cm^{-1}$) was utilized in all experiments including the preparation of all aqueous solutions. The calibration solutions of $NO_3^-$ and $Cl^-$ were in the range of 0.1 µM to 0.1M and were made by successive 10-fold dilutions from a 1M solution of $KNO_3$ and NaCl, respectively. Generally, the major anions in natural water are chloride (Cl), sulfate ($SO_4$), bicarbonate ($HCO_3$) and carbonate ($CO_3$) [26]. It has to be mentioned that the $NO_3$ ISE experiences significant interference from Cl, $HCO_3$ and $CO_3$. Whereas, the Cl ISE experiences significant interference only from $NO_3$. Also, the interfering ions $HCO_3$ and $CO_3$ can be reduced by lowering the pH to under 4. Therefore, background buffer solution, 0.1M sodium sulfate and 1.25 mM sulfuric acid, where pH was adjusted to 3.2 (measured by an Orion pH electrode), was used to eliminate the interference from hydrogen carbonate and carbonate. There is no significant interference from sulfate to either of the two ISEs tested. All working standard solutions were prepared daily and stored in polyethylene containers. The laboratory-based instrument IC served to confirm the concentrations of these two ions for each solution.

The potentiometric system consisted of 4 pH amplifiers (ADInstruments Co.) applied as signal amplifiers while the PowerLab (ADInstruments Co.) served to interface the computer with the amplifiers. Chart5 for Windows software (ADInstruments Co.) was used for the data acquisition and filtering phases. Data processing and analysis was undertaken in Matlab R2012b using the Statistical Analysis and neural network toolboxes. Microsoft Excel 2010 was applied for data recording and searching the regression lines. SPSS 20 for Windows generated the Orthogonal Experimental Design and Pearson correlation coefficients for interference analysis. The electrodes were connected to electronic amplifiers, sharing the same measuring conditions that included: the reference electrode and grounded earth. A 10 Hz low-pass digital filter eliminated the noise caused by signal granularity generated by electrodes. One Magnetic Stirrer (IEC, C876083V) with a spin bar, and several beakers (Schott Duran 250 mL) were used for sample and standard preparation.

Standards and samples containing various combinations of each ion were directly measured by ISEs using the standard addition method. All measurements were carried out at the same temperature (22° C.) in triplicate and the average values reported for processing. During measurement, electrode membranes were completely free from air bubbles after immersion into an analysis solution. The final electrode potential was only recorded when stable, i.e. at a constant potential of ±0.05 mV, over 30 seconds. Single point calibrations with standard solutions (1 mM of $NaNO_3$ and 10 mM of NaCl) were carried out every hour. After each measurement, all containers and electrodes were carefully rinsed with deionized water and blotted dry on tissue paper to prevent electrode cross-contamination.

The detection limit and linear detection range were estimated for each ISE in the array of electrodes using single ion standard solutions (NaCl and $KNO_3$) and each solution was measured in triplicate. The detection limit and linear response range were calculated according to the IUPAC recommendations. Both the Cl ISE and $NO_3$ ISE have a detection limit of 10 µM, and a linear response range of 0.1 mM to 0.1M. The slopes of the calibration curves for Cl-ISE and $NO_3$-ISE were 37.8 and 35.7, respectively. Both $NO_3$ and Cl ISEs' responses can be expressed using the Nikolsky-Eisenmann equation. Therefore, the response of these two ISEs to the major selected ions can be expressed as (1) and (2):

$$V_{pC_{NO_3}} = P_1 \times pNO_3 + P_2 = 35.7 \times pNO_3 + 246.8 \quad (1)$$

$$V_{pC_{Cl}} = P_1 \times pCl + P_2 = 37.8 \times pCl + 247.2 \quad (2)$$

Where 'P1' to 'P2' are the parameters to be configured, provided $NO_3$ and Cl are in the calibration range.

For the interference study, the cross-interference phenomena for these two ions and their ISEs are illustrated in FIGS. 2A and 2B. It can be seen that both ISEs suffered from interference. If a calibration method were to be implemented for predicting a desired ion's concentration without considering the interferences, the higher the interfering ion concentration, the larger the prediction errors would be. However, it is also evident that the impacts of interference were weakened as the concentration of the target analyte increased. As illustrated in FIG. 2A, taking the nitrate ISE against $KNO_3$ (zero to 10 mM) and NaCl (zero to 100 mM) as an example, ΔV represents the potential difference value of the nitrate ISE's response value caused by an interfering ion. Based on the difference between the concentration levels of the interfering ion (Cl) and the major selected ion $NO_3$, it can be seen in FIG. 2A that for constant values of $KNO_3$, and as the NaCl concentration is increased logarithmically, the nitrate ISEs' response to Cl increases exponentially. Similar behaviour is observed with the Cl ISE's response to $KNO_3$ in FIG. 2B. The interference relationship can be expressed using log-exponential equations as (3) and (4):

$$V_{ISE} = V_{pC_{Selected}} + \Delta V_{pC_{Selected}\text{-}pC_{Interferon}} \quad (3)$$

$$\Delta V = P_1 \times e^{P_2 \times (pC_{Selected}\text{-}pC_{Interferon})} \quad (4)$$

Where:
$V_{ISE}$—the potential response value of ISE;
V $pC_{Selected}$—the potential value caused by the major selected ion;
ΔV—the potential difference of each ISE's response caused by an interfering ion;
$pC_{Selected}$—the concentration of the major selected ion (Unit: -lg M);
$pC_{Interfering}$—the concentration of the interfering ion (Unit: -lg M);
'$P_1$' and '$P_2$'—the parameters to be determined.

Therefore, according to the equations (1) and (4), for the response of the ISEs to the mixture solutions of $KNO_3$ and NaCl, the $NO_3$ ISE response to nitrate concentration with chloride interference can be expressed as (5):

$$V_{ISE_{NO_3}} = V_{pC_{NO_3}} + \Delta V_{pC_{Cl}} = P_1 \times pNO_3 + P_2 + P_3 \times e^{P_4 \times (pNO_3 - pCl)} \quad (5)$$

Where $P_1$, $P_2$, $P_3$, $P_4$ are the parameters that should be configured and optimized using the recalibration algorithm, which is the embodiment is a Genetic Algorithm.

Cl ISE response to chloride concentration with nitrate interference can be expressed as (6):

$$V_{ISE_{Cl}} = V_{pC_{Cl}} + \Delta V_{pC_{NO_3}} = P_1 \times pCl + P_2 + P_3 \times e^{P_4 \times (pCl - pNO_3)} \quad (6)$$

Where $P_1$, $P_2$, $P_3$, $P_4$ are the parameters that should be configured and optimized by the GA.

As described, the genetic algorithm (GA) was applied to optimize the parameters $P_1$ to $P_4$. The parameters of each ISE were determined using two steps: firstly, $P_3$ and $P_4$ were determined using data for the pure major selected ion solutions; and secondly, $P_1$ and $P_2$ were optimized using various interfering ion solutions with constant concentrations of the major ion. Therefore, in configuring the regression equation of each ISE, GA would be applied twice to determine $P_3$ and $P_4$ then $P_1$ and $P_2$. Reflecting the computational limitations of a personal computer, the GA was set at 40 chromosomes in one generation (population=40). For creating chromosomes, 40 vectors were initialized with two unit norm random values and converted into decimal integers (ranging from 0 to 1000). Then these decimal integers were converted into ten digit binary numbers. Every vector, which has two values representing two parameters, will therefore contain twenty digit binary numbers that represent one chromosome.

Figure 3A:
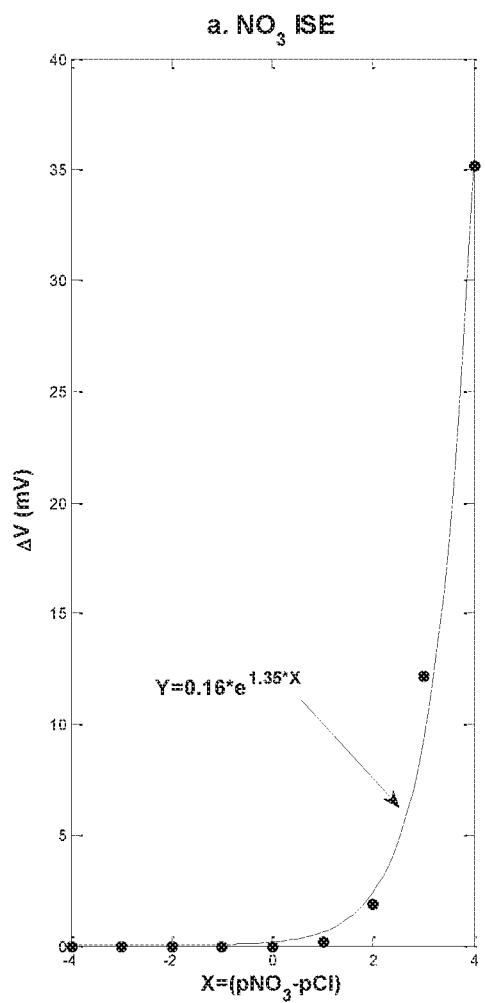
FIG. 3A shows the potential difference value in the $NO_3$ ISEs' response based on the sensed concentration of Cl and $NO_3$ ions, according to an embodiment of the invention.
Figure 3B:
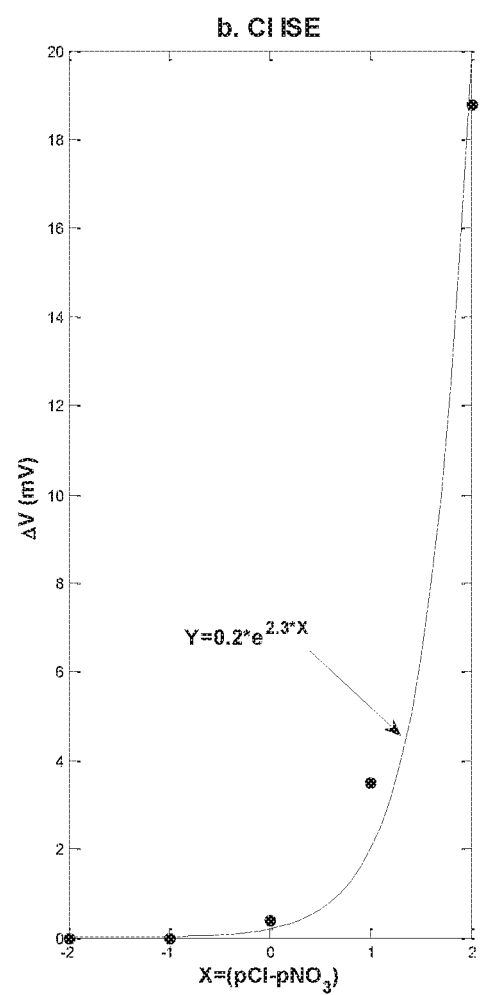
FIG. 3B shows the potential difference value in the Cl ISEs' response based on the sensed concentration of Cl and $NO_3$ ions, according to an embodiment of the invention.

The fitness function was based on the mathematical formula (5) and (6). The fewer errors in the calculated values against the real measurement values, the better fitness of the chromosome. For the fitness function, for each chromosome, firstly, the two binary numbers were converted back to decimal integers and scaled to the ranges as 0 to 50 for parameter '$P_1$', 0 to 400 for '$P_2$', 0 to 1 for 'P3' and 0 to 10 for 'P4', respectively. In every GA generation, the fitness value of each chromosome was calculated and checked. The GA continued until a proper chromosome was found, whose fitness value satisfied the accuracy (with the sum of absolute errors less than 0.1) or terminated when the maximum number of generations (set at 1000) was reached. For offspring, the parents were selected using Stochastic Universal Sampling, recombined by multi-point crossover and mutating each element with an initial probability (p=0.7). By using this selection method, the chromosomes with better fitness values are more likely to be selected as the parents and breed the offspring for next generations. After applying the GA, the optimized parameters for the NO₃ ISE and Cl ISE are shown in FIGS. 3A and 3B. The response equations for the ISEs can thus be expressed as (7) and (8), respectively:

$$V_{ISE_{NO_3}} = 35.7 \times pNO_3 + 0.16 \times e^{1.35 \times (pNO_3 - pCl)} + 246.8 \quad (7)$$

$$V_{ISE_{Cl}} = 37.8 \times pCl + 0.2 \times e^{2.3 \times (pCl - pNO_3)} + 274.2 \quad (8)$$

Figure 4:
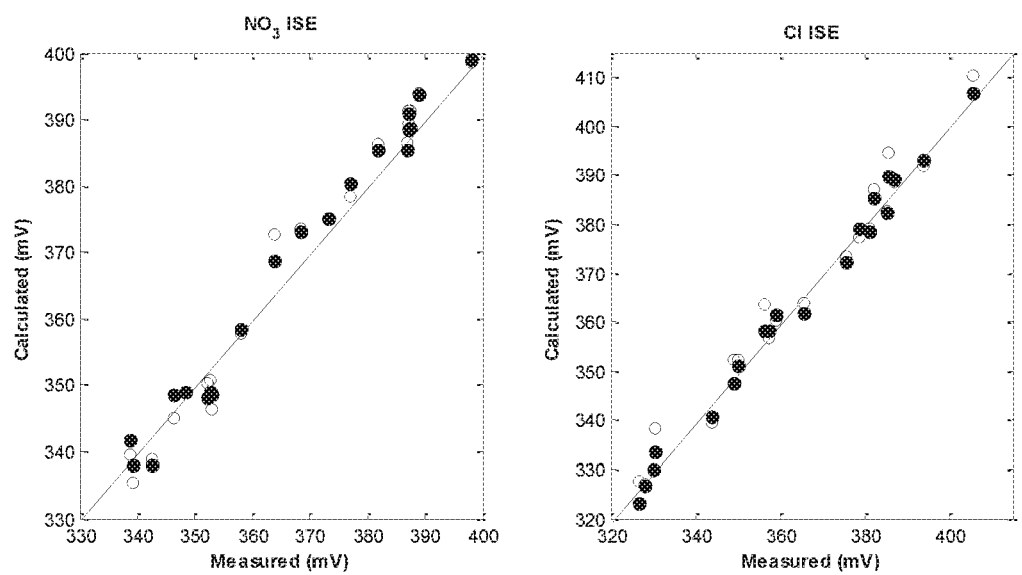
FIG. 4 shows calibration and recalibration results of the device, according to an embodiment of the invention.

To validate the recalibration algorithm, an additional 20 synthesized samples combining random levels of concentrations for the two ions were prepared in the same background solution. The measured values of each ISE's response against the simulated values using the recalibration algorithm, are illustrated in FIG. 4, and represented as full circles. It can be seen that for the two ISEs, the potential response values calculated using the recalibration algorithm are close to the real measurement values, although the calculated nitrate ISE's response values were slightly lower than the real measured values. The mean absolute errors (MAE) were 2.8 and 2.3 mV, for the NO₃ ISE and Cl ISE, respectively. The recalibration algorithm can thus be used to recalibrate the device using the output data of the recalibration algorithm as training data for the neural network algorithm.

To perform temporal stability measurements of the recalibration algorithm, the ISE array in the embodiment was stored in a mixture solution, containing 1.0 mM KNO₃ and 10 mM NaCl with the same background solution for 4 weeks. The sensitivity and selectivity of each ISE was measured once in triplicate in each one week period using the same calibration standard solutions. After 4 weeks, the response of the ISEs can be expressed as the equations (9) and (10):

$$V_{ISE_{NO_3}} = 27.1 \times pNO_3 + 0.1 \times e^{1.4 \times (pNO_3 - pCl)} + 227 \quad (9)$$

$$V_{ISE_{Cl}} = 30.3 \times pCl + 0.12 \times e^{2.4 \times (pCl - pNO_3)} + 251.8 \quad (10)$$

Compared to equations (7) and (8), it is obvious that the values of all the parameters ($P_1$ to $P_4$) in the equations have changed. With the exception of $P_3$, the values of all parameters have decreased. It is evident that over four weeks, both the sensitivity and selectivity of each ISE were impaired, reflecting in the decreasing calibration slopes. Furthermore, the potential values of both ISEs gradually fell. Using the same data applied to temporal stability measurements, the repeatability and reproducibility (R&R) for the ISEs were estimated by ANOVA Gauge R&R analysis. In this analysis, the response results of ISEs for each standard solution were considered as 'parts', and the data consisted as four parts. The measurements in each week were defined as different 'operators' and there were five operators: initial and week #1-4. The number of 'trails' was set at three since every solution was measured in triplicate.

Since the ISEs' response to the major selected ions without interference can be expressed as (1) and (2) and the impact of interference can be expressed as equation (4), the re-calibration can be performed simply by using only four standard solutions, as illustrated in Table 1. This combination allows the parameters of the ISEs to be determined using GA, as described.

The R&R results, represented by Percentage of Gauge R&R of total variations (PRR), are also shown below in Table 2 with the relative variances. The PPR values evaluated these candidates based on the results of measurements over four weeks. Based on our ISE temporal stability experiment, it can be concluded that both the sensitivity and selectivity of ISEs became impaired over time. In this situation the cross-interference characteristics should be considered in the recalibration of the device.

TABLE 2

Characteristics for the ISEs

| ISE | Sensitivity[1] | Stability[2] | Repeatability[3] | Reproducibility[3] | PRR[4] |
|---|---|---|---|---|---|
| NO₃ | 35.7 | 8.3 | 0.18 | 2.67 | 18.61 |
| Cl | 37.8 | 7.5 | 0.17 | 3.35 | 16.23 |

[1]Unit: mV/dec;
[2]% of the decrease of sensitivity;
[3]% of Variance based on ANOVA Gauge R&R analysis;
[4]% of Gauge R&R of total variations It should be noted that for determining $P_1$ and $P_2$ for the Cl ISE, solutions #2 and #3 contained different concentrations of KNO₃ (see Table 1). The concentrations were zero and 0.1 mM, respectively. Actually, this difference in KNO₃ concentration had little impact on the Cl ISE (FIGS. 2A and 2B). Since 'ΔV' was only 0.6 mV between NaCl from zero to 0.1 mM. Therefore, by using these four solutions as stated in Table 1, and after optimization via GA, the ISEs' response equations are expressed as (11) and (12):

$$V_{ISE_{NO_3}} = 34.8 \times pNO_3 + 0.13 \times e^{1.4 \times (pNO_3 - pCl)} + 247.4 \quad (11)$$

$$V_{ISE_{Cl}} = 38.3 \times pCl + 0.19 \times e^{2.3 \times (pCl - pNO_3)} + 276.8 \quad (12)$$

The MAEs were 2.9 and 3.0 for NO₃ ISE and Cl ISE, respectively. It can be concluded that compared to the original calibration model, it is possible to successfully re-build the mathematical model for the ISEs' response characteristics using only four standard solutions without a significant difference in results.

Figure 5:
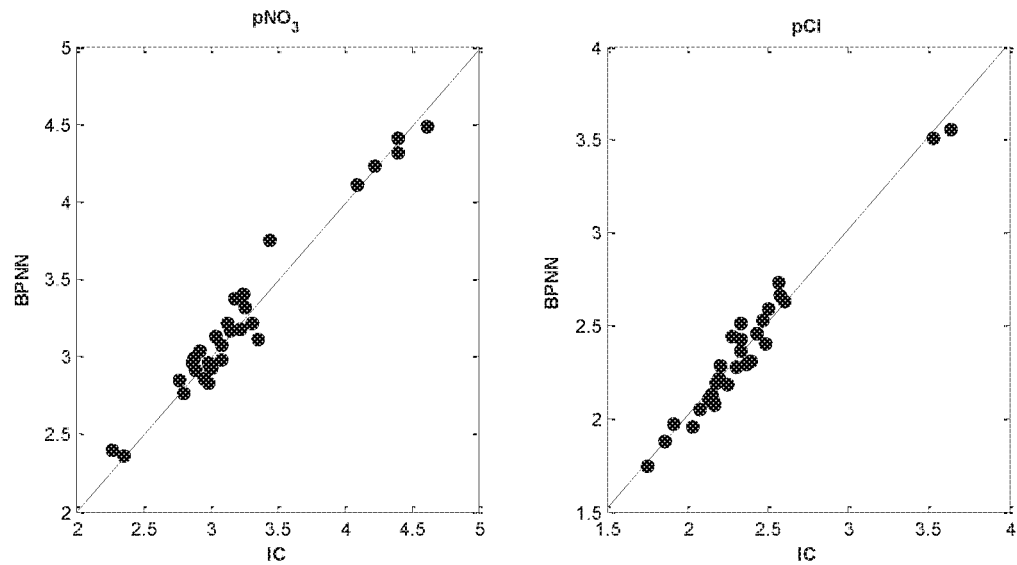
FIG. 5 shows further calibration and recalibration results of the device, according to an embodiment of the invention.

In another embodiment, to simulate real water samples for validation of the ISE array system, 30 different soil samples were used to obtain soil leachates. These 30 samples were collected from three states in Australia: Queensland, New South Wales and South Australia. 200 g of each sample was then housed in a 6 cm internal diameter PVC pipe. A fabric filter (micron efficiency of 100 μm) was put into the bottom of each PVC pipe. Deionized water was pumped into each soil sample by a peristaltic pump to simulate artificial rain. The pump's flow rate was adjusted based on different soil characteristics. The KNO₃ and NaCl salts were spiked into the leachates at random concentrations and these concentrations were determined using Ion Chromatography (IC). Before being measured by the ISE array, the samples were pre-treated by adding sodium sulfate and sulfuric acid to resemble a background condition similar to that of the training samples, in order to maintain the same ionic strength and lower the pH to almost 3 to eliminate any interference from HCO₃ and CO₃. Recalibration, as per the invention, for the ISE array was performed twice a day during the measurement. Each sample was measured in triplicate by ISE array and in duplicate by ICs and the average values recorded. The prediction results compared to IC for Cl and $NO_3$ are shown in FIG. 5. Compared to the 1:1 line, it is clearly evident that by using the simulation data, the prediction results for $NO_3$ and Cl were similar to those obtained using IC, with MRE of 6.2% and 5.4% for $NO_3$ and Cl, respectively.

Since both the sensitivity and selectivity of ISEs have been found to degrade over time, thus the characteristics of the cross-interfering should also be considered in re-calibration. Instead of building the BPNN prediction system with large number of training samples each time, which is inconvenient and unpractical. The developed mathematical equations of the recalibration algorithm can be used to simulate the response values of ISE array, and to determine the analytes' concentrations from unknown samples with relatively few samples (e.g. 4 samples). As described, these mathematical equations were developed based not only on each ISE's response to their major selected ion, but also to the interfering ion. Furthermore, the ISE array system can be recalibrated by measuring only a couple of selected standard solutions. As shown in the case study, based on the measurement of the selected four standard solutions, GA can be employed to optimize the parameters in the equations developed to describe the ISEs' response. It has been shown that Cl and $NO_3$ can be determined simultaneously with acceptable accuracy using the simulation data with the proposed re-calibrating methodology. However, as the mathematical equations were developed using synthesized samples with finite concentration ranges, they may not be suitable for measuring chemicals whose concentrations are outside the training ranges used.

Figure 7:
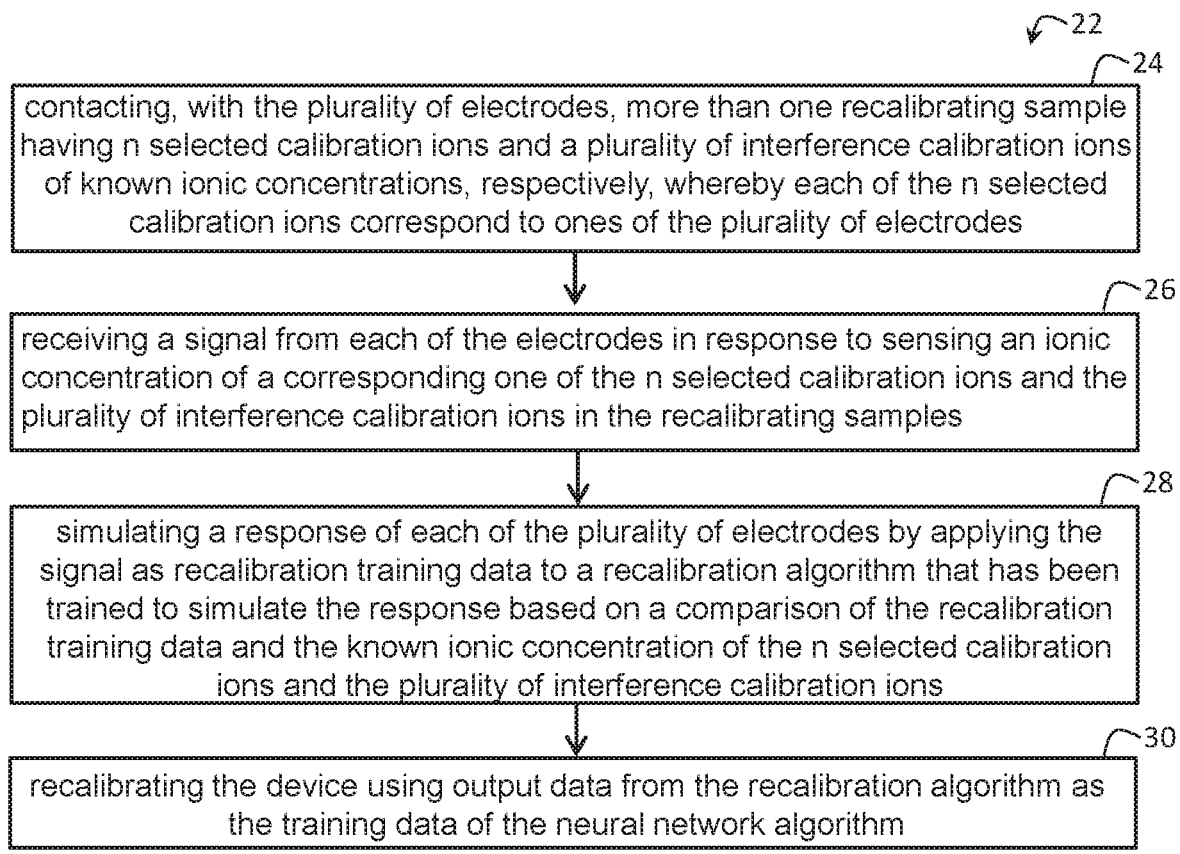
FIG. 7 is a flow chart of a method of recalibrating a device for assessing concentration of at least one analyte ion in a liquid, according to another embodiment of the invention.

According to another embodiment of the present invention there is provided a method of recalibrating a device for assessing concentration of at least one analyte ion in a liquid, as shown in FIGS. 1 and 7. In the embodiment, the method 22 shown in FIG. 6 for recalibrating the device includes the steps of: contacting 24, with the plurality of electrodes, more than one recalibrating sample having n selected calibration ions and a plurality of interference calibration ions of known ionic concentrations, respectively, whereby each of the n selected calibration ions correspond to ones of the plurality of electrodes; receiving 26 a signal from each of the electrodes in response to sensing an ionic concentration of a corresponding one of the n selected calibration ions and the plurality of interference calibration ions in the recalibrating samples; simulating 28 a response of each of the plurality of electrodes by applying the signal as recalibration training data to a recalibration algorithm that has been trained to simulate the response based on a comparison of the recalibration training data and the known ionic concentration of the n selected calibration ions and the plurality of interference calibration ions; and recalibrating 30 the device using output data from the recalibration algorithm as the training data of the neural network algorithm.

In this embodiment, the ISEs of the device of FIG. 1 are also employed and are an array of solid state electrodes comprising Prussian Blue modified Carbon Paste Electrodes (PB-CPE). In this embodiment, the Prussian blue modified Carbon Paste Electrodes (PB-CPE) were applied to determine the four exchangeable cations. Prussian blue (PB) or iron (III) hexacyanoferrate (II) is an inorganic polycrystal with well-known electrochromic and electrocatalytical capabilities. Mixing PB with graphite powder to prepare Carbon Paste (CP) is a cheap, simple and effective mixing technique to create the electrode body. For making the PB-CPE body, Iron (III) ferrocyanide powder was mixed with Graphite powder in a 1:9 ratio by weight. This powder mixture was transferred to an agate mortar and mixed thoroughly for 5 minutes with 20 wt % mineral oil. The homogeneous paste was placed in the electrode holders, which were made from 10-100 µL pipette tips, connected with a copper cable and sealed with epoxy. The electrode paste surface was smoothed onto a glass plate. The geometric diameter of the electrode surface was 5 mm. The ISE array contained an Ag/AgCl reference electrode and 4 PB-GCE working electrodes. The ion-sensitive membranes were prepared by adding a solution drop-wise and the formulation included: the ionophore, an ionic additive ($K_+TpClPB^-$), the plasticizer and PVC in tetrahydrofuran (THF). Membrane' details are available in Table 3.

TABLE 3

PVC membranes for four exchangeable ions

| ISE | Ionophore (w.t. %) | Additive (w.t. %) | Plasticizer (w.t. %) | PVC (w.t. %) |
|---|---|---|---|---|
| $Na^+$ | Ionophore VI (1.0) | $K_+TpClPB^-$ (0.1) | DOS (65.9) | 33.0 |
| $K^+$ | Valinomycin (1.0) | $K_+TpClPB^-$ (0.5) | DOS (65.5) | 33.0 |
| $Ca^{2+}$ | ETH5234 (1.0) | $K_+TpClPB^-$ (0.3) | oNPOE (66.0) | 32.9 |
| $Mg^{2+}$ | ETH5506 (1.0) | $K_+TpClPB^-$ (0.7) | oNPOE (66.3) | 32.0 |

All reagents employed in this embodiment were of analytical grade and used directly without further purification, unless otherwise stated. Deionized water (with resistivity of 18.2 MΩ cm$^{-1}$) was utilized in all experiments including the preparation of all aqueous solutions. The calibration solutions of the four exchangeable cations were in the range of 0.1 mM to 0.1M and were made by successive 10-fold dilutions from a 1M solution of $NaNO_3$, $KNO_3$, $Ca(NO_3)_2$ and $Mg(NO_3)_2$. The pH of solutions was around 5.5 (measured on a pH electrode). All working standard solutions were prepared daily and stored in polyethylene containers. The laboratory-based instrument ICP-OES served to confirm the concentrations of these ions for each solution.

The potentiometric system of this embodiment consisted of 4 pH amplifiers applied as signal amplifiers. Software was used for the data acquisition and filtering phases. Data processing and analysis was undertaken in Matlab™ using the Statistical Analysis and neural network toolboxes. Microsoft Excel™ was applied for data recording and searching the regression lines. The electrodes were connected to electronic amplifiers, sharing the same measuring conditions that included the reference electrode and grounded earth. A 10 Hz low-pass digital filter eliminated the noise caused by signal granularity generated by electrodes. One Magnetic Stirrer with a spin bar and several beakers (e.g. 250 mL) were used for sample and standard preparation.

Standards and samples containing various combinations of each ion were directly measured by ISEs using the standard addition method. All measurements were carried out at the same temperature (22° C.) in triplicate and the average values reported for processing. During measurement, electrode membranes were completely free from air bubbles after immersion into an analysis solution. The final electrode potential was only recorded when stable (i.e. at a constant potential of ±0.05 mV, over 30 seconds). After each measurement, all containers and electrodes were carefully rinsed with deionized water and blotted dry on tissue paper to prevent electrode cross-contamination.

Using the same ionophores as this first embodiment, the initial detection limit and linear detection range for each ISE was estimated using their single ion standard solutions. The detection limit and linear response range were calculated according to the IUPAC recommendations. Except for sodium, whose detection limit was around 0.05 mmol/L and linear response ranged from 1.0 to 100 mmol/L, the remaining ions could be detected under 0.01 mmol/L and linear response ranged from 0.1 to 10 mmol/L. For sodium and potassium, which are monovalent ions, the calibration curves' slopes were 45.1 and 46.8, respectively. For divalent ions the slopes were 27.3 and 26.9 for calcium and magnesium, respectively. Without interferences, all the ISEs' responses can be expressed using the Nikolsky-Eisenmann equation. Therefore, according to the embodiment, the response of the ISEs to the major selected ions can be expressed as (13):

$$V_{pC_{Selected}} = a \times pC_{Selected} + b \quad (13)$$

Where 'a' to 'b' are the parameters to be configured for each ISE, provided the concentrations of $pC_{selected}$ are in the calibration range.

Figure 8:
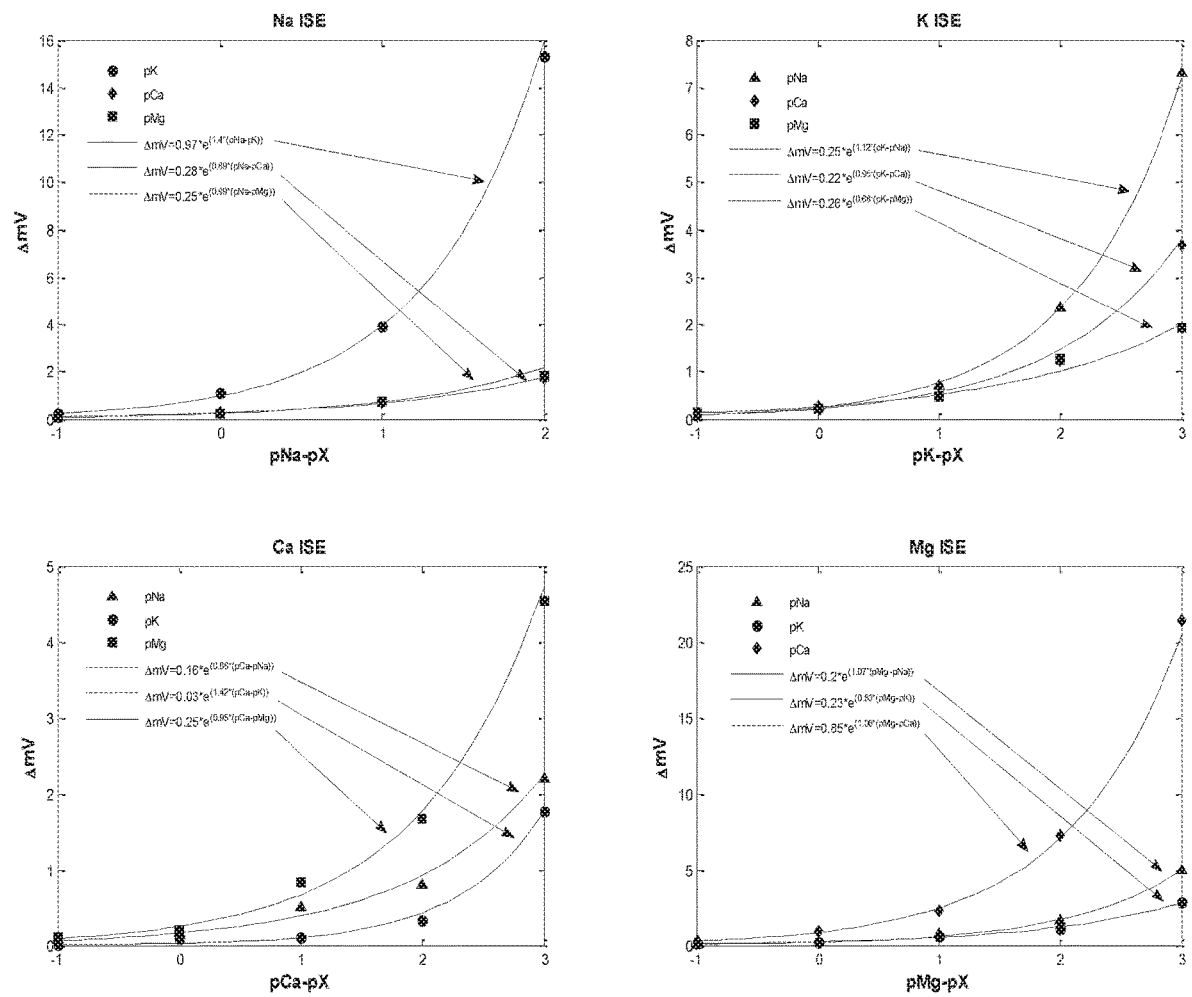
FIG. 8 shows interference characteristics of ISEs of the device configured to simulate a response value to sensing a ions in a recalibration sample, according to an embodiment of the invention.

For the interference study, the cross-interference phenomena for the four exchangeable cations and their ISEs are illustrated in FIG. 8. In FIG. 8, the y axis represents the potential difference (ΔmV) of each of the ISE's response caused by an interferon. The x axis represents the concentration differences between the major selected ion and the interferon. It can be seen that cross-interference phenomena existed in all ISEs that we employed, and some severe interference occurred when the K, Na and Ca ions influenced the Na, K and Mg ISE, respectively. It can be concluded that if a calibration method were to be implemented for predicting a desired ion's concentration without considering the interferences, for constant concentrations of selected ion, the higher the interferon's concentration, the larger the prediction error. Moreover, it is also evident that the impacts of interference were weakened as the concentration of the target analyte increased. As mentioned above, for the scenario with only one interferon present, based on the difference between the concentration levels of the interfering ion and the major selected ion, for constant values of selected ion, and as the interfering ion's concentration is increased logarithmically, the related ISE's response to the interfering ion increases exponentially, which can be expressed as (14) and (15):

$$V_{ISE} = V_{pC_{Selected}} + \Delta V_{pC_{Selected} - pC_{Interferon}} \quad (14)$$

$$\Delta V_{pC_{Selected} - pC_{Interferon}} \approx c \times e^{d \times (pC_{Selected} - pC_{Interferon})} \quad (15)$$

Where:
$V_{ISE}$—the potential response value of ISE (Unit: mV);
$V_{pC_{Selected}}$—the potential value caused by the major selected ion (Unit: mV);
ΔV—the potential difference of each ISE's response caused by an interferon (Unit: mV);

$pC_{Selected}$—the concentration of the major selected ion (Unit: -lg M);
$pC_{Interferon}$—the concentration of the interferon (Unit: -lg M);
'c' and 'd'—the parameters to be determined.

Therefore, according to the equations (13) and (15), the response of the ISEs to a mixture solution with the selected ion and only one interferon presented, can be expressed as (16):

$$V_{ISE} \approx a \times pC_{Selected} + b + c \times e^{d \times (pC_{Selected} - pC_{Interferon})} \quad (16)$$

Where 'a', 'c' and 'd' are the parameters that should be configured and optimized.

After the initial measurements, the parameters for the ISEs of the four exchangeable cations to their selected ion and the cross-interfering relationships are estimated and listed in Table 4.

TABLE 4

The initial characteristics for the ISEs

| ISE | a | b | $c_{Na}$ | $c_K$ | $c_{Ca}$ | $c_{Mg}$ | $d_{Na}$ | $d_K$ | $d_{Ca}$ | $d_{Mg}$ |
|---|---|---|---|---|---|---|---|---|---|---|
| Na$^+$ | −45.1 | 276.5 | — | 0.97 | 0.28 | 0.25 | — | 1.4 | 0.89 | 0.99 |
| K$^+$ | −46.8 | 278 | 0.25 | — | 0.22 | 0.26 | 1.12 | — | 0.95 | 0.68 |
| Ca$^{2+}$ | −27.3 | 235.6 | 0.16 | 0.03 | — | 0.21 | 0.9 | 1.42 | — | 0.98 |
| Mg$^{2+}$ | −26.9 | 157.9 | 0.2 | 0.23 | 0.85 | — | 1.07 | 0.83 | 1.06 | — |

To study the multi-interfering scenario and build up mathematical models for simulation, an orthogonal experiment design (OED) with 16 synthesized samples combining a constant concentration of selected ion with different concentration levels of interferons was setup for each ISE (Table 5).

TABLE 5

Orthogonal experimental design for interference study

| No. | $\Delta pC_{Interferon_1}$* | $\Delta pC_{Interferon_2}$ | $\Delta pC_{Interferon_3}$ |
|---|---|---|---|
| C1 | 0 | 0 | 2 |
| C2 | 0 | −1 | 0 |
| C3 | 2 | −1 | 2 |
| C4 | 1 | 0 | −1 |
| C5 | 1 | −1 | 1 |
| C6 | −1 | 1 | 2 |
| C7 | −1 | −1 | −1 |
| C8 | −1 | 2 | 0 |
| C9 | 1 | 2 | 2 |
| C10 | −1 | 0 | 1 |
| C11 | 2 | 0 | 0 |
| C12 | 2 | 2 | 1 |
| C13 | 0 | 2 | −1 |
| C14 | 1 | 1 | 0 |
| C15 | 2 | 1 | −1 |
| C16 | 0 | 1 | 1 |

Figure 9:
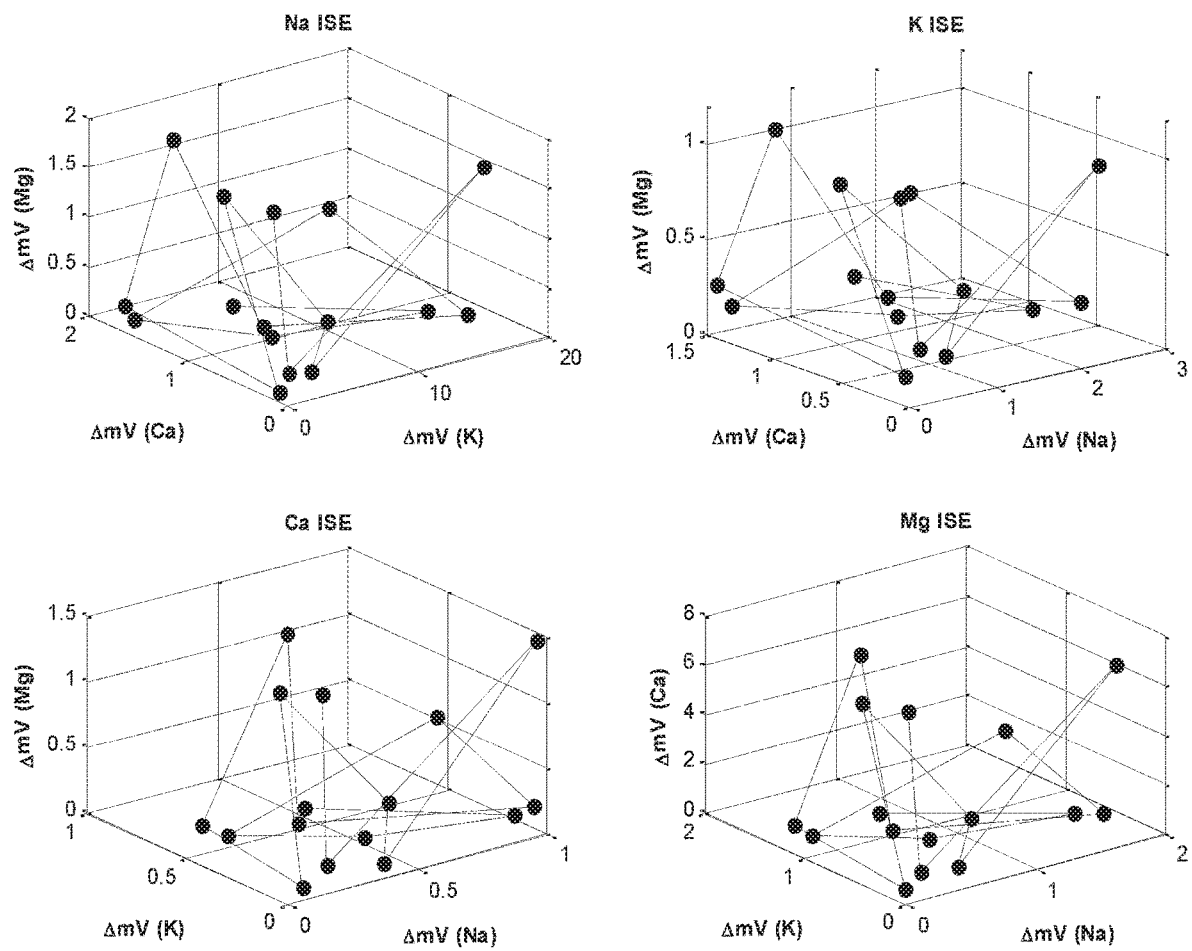
FIG. 9 shows the simulated potential difference value in the ISEs' response according to an embodiment of the invention.
Figure 10:
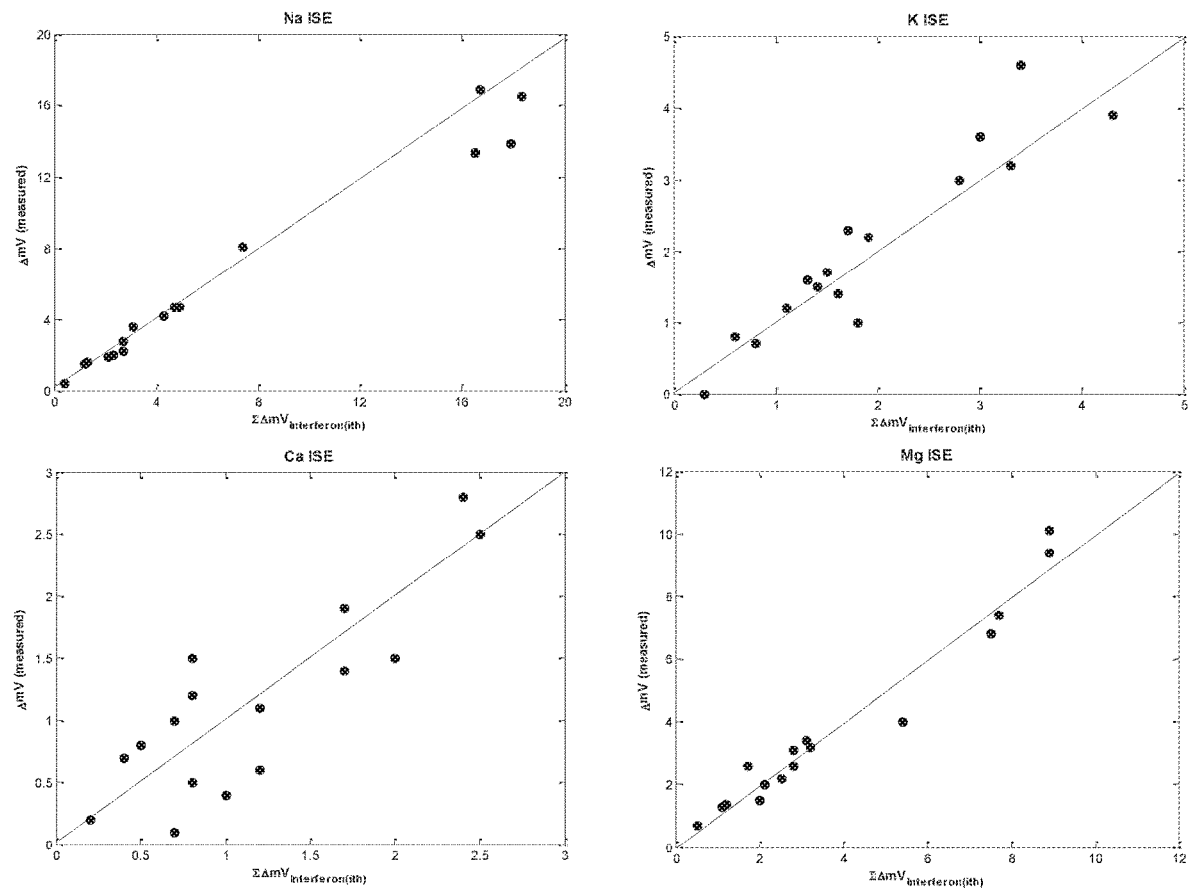
FIG. 10 shows calibration and recalibration results of the device, according to an embodiment of the invention.

*$\Delta pC_{Interferon_i} = pC_{Selected} - pC_{Interferon_i}$
pC = −lg M;
Na ISE: Interferon 1, 2, 3 are ion K, Ca and Mg, respectively
K ISE: Interferon 1, 2, 3 are ion Na, Ca and Mg, respectively
Ca ISE: Interferon 1, 2, 3 are ion Na, K and Mg, respectively
Mg ISE: Interferon 1, 2, 3 are ion Na, K and Ca, respectively The simulated potential differences caused by these interferons independently are also illustrated in FIG. 9, using equation (16) with the initial parameters listed in Table 4. Comparing the measuring results of ISE array against the simulated results using the equations, it is observed that the 'ΔV' caused by multi-interferons actually is approximately equal to the summation of the 'ΔV' caused by each interferon respectively. The real measuring results against the summation of simulated data are shown in FIG. 10. The response of the ISEs to a mixture solution with the selected ion and multi-interferon present, can be approximately expressed as (17) and (18):

$$V_{ISE} = V_{pC_{Selected}} + \sum_{i=1}^{n} \Delta V_{pC_{Selected} - pC_{Interferon_i}} \qquad (17)$$

$$V_{ISE} \approx a \times pC_{Selected} + b + \sum_{i=1}^{n} c_i \times e^{d_i \times (pC_{Selected} - pC_{Interferon_i})} \qquad (18)$$

Where:
$V_{ISE}$—the potential response value of ISE (Unit: mV);
$V\ pC_{Selected}$—the potential value caused by the major selected ion (Unit: mV);
$\Delta V$—the potential difference of each ISE's response caused by each interferon (Unit: mV);
$pC_{Selected}$—the concentration of the major selected ion (Unit: -lg M);
$pC_{Interferon_i}$—the concentration of the $i^{th}$ interferon (Unit: -lg M);
'$c_i$' and '$d_i$'—the parameters for the $i^{th}$ interferon to be determined.

As mentioned, both selectivity and sensitivity of ISEs are deteriorated over time; hence, all the parameters 'a', 'b', '$c_i$' and '$d_i$' in equation (18) must be adjusted and optimized each time calibration is conducted to maintain prediction accuracy. Since the impacts caused by multi-interferons are approximately equal to the summation of the impacts caused by individual interferon, the recalibration for multi-interfering parameters in the equation (18) can be performed simply by calibrating the ISE using equation (13) for the parameters 'a', 'b', and each individual interferon using equation (15) for the parameters '$c_i$' and '$d_i$'. As illustrated in Table 6, only five standard solutions are needed to train these parameters.

Genetic Algorithm (GA) was applied to optimize the parameters 'a', 'b', '$c_i$' and '$d_i$' for each equation. The parameters of each ISE were determined using two steps: firstly, 'a' and 'b' were determined using the data from measuring the standard solutions as mentioned in Table 5, using equation (13); and secondly, for each interferon, '$c_i$' and '$d_i$' were optimized using various interfering ion solutions with constant concentrations of the major ion (Table 6), using equation (15). Reflecting the computational limitations of a personal computer, the GA was set at 40 chromosomes in one generation (population=40). For creating chromosomes, 40 vectors were initialized with two unit norm random values and converted into decimal integers (ranging from 0 to 1000). Then these decimal integers were converted into ten digit binary numbers. Every vector, which has two values representing two parameters, will therefore contain twenty digit binary numbers that represent one chromosome. For each ISE, the fitness function was based on equation (13) for 'a' and 'p'; equation (15) for '$c_i$' and '$d_i$'. The fewer errors in the calculated values against the real measurement values, the better fitness of the chromosome. For the fitness function, for each chromosome, firstly, the two binary numbers were converted back to decimal integers and scaled to the ranges as 0 to -50 for parameter 'a', 0 to 400 for 'p', 0 to 3 for '$c_i$' and '$d_i$', respectively. In every GA generation, the fitness value of each chromosome was calculated and checked. The GA continued until a proper chromosome was found, whose fitness value satisfied the accuracy (with the sum of absolute errors less than 0.1) or terminated when the maximum number of generations (set at 1000) was reached. For offspring, the parents were selected using Stochastic Universal Sampling, recombined by multipoint crossover and mutating each element with an initial probability (p=0.7). By using this selection method, the chromosomes with better fitness values are more likely to be selected as the parents and breed the offspring for next generations.

TABLE 6

Standard calibration solutions

| Mmol/L | | | | Na ISE | | | | K ISE | | | | Ca ISE | | | | Mg ISE | | | |
|---|---|---|---|---|---|---|---|---|---|---|---|---|---|---|---|---|---|---|---|
| Na | K | Ca | Mg | a, b | $c_K$, $d_K$ | $c_{Ca}$, $d_{Ca}$ | $c_{Mg}$, $d_{Mg}$ | a, b | $c_{Na}$, $d_{Na}$ | $c_{Ca}$, $d_{Ca}$ | $c_{Mg}$, $d_{Mg}$ | a, b | $c_{Na}$, $d_{Na}$ | $c_K$, $d_K$ | $c_{Mg}$, $d_{Mg}$ | a, b | $c_{Na}$, $d_{Na}$ | $c_K$, $d_K$ | $c_{Ca}$, $d_{Ca}$ |
| 1.0 | 0.1 | 0.1 | 0.1 | ✓ | ✓ | ✓ | ✓ | ✓ | ✓ | ✓ | ✓ | ✓ | ✓ | ✓ | ✓ | ✓ | ✓ | ✓ | ✓ |
| 100 | 0.1 | 0.1 | 0.1 | ✓ | | | | | ✓ | | | | ✓ | | | | ✓ | | |
| 1.0 | 10 | 0.1 | 0.1 | | ✓ | | | | | | | | | ✓ | | | | | |
| 1.0 | 0.1 | 10 | 0.1 | | | ✓ | | | | ✓ | | ✓ | | | | | | | ✓ |
| 1.0 | 0.1 | 0.1 | 10 | | | | ✓ | | | | ✓ | | | | ✓ | ✓ | | | |

It should be noted that the five rows for each of the standard solutions represent standard solutions #1-#5. Also, all the standard solutions #1-#5 are mixtures with the interferons present. Take the solution #1 for instance, which contains 1 mM of sodium and 0.1 mM of other cations. For the Na ISE, the concentration of all its interferons are lower than the selected ion; for the other three ISEs, their interferons' concentration are either ten-fold higher or equal. However, according to FIG. 8, none of these interferons could cause higher than 1 mV potential variation to their related ISEs; hence the interfering impacts were negligible. The rest of the standard solutions #2 to #5, are dominated by one of the cations and the interferences from other ions are also negligible.

The mathematical models and recalibration methods focused on data regeneration and simulation of the ISE array response. When measuring an unknown solution using an ISE array, the potential values of each ISE is known, but the concentrations of the desired ions are unknown. As mentioned that in a multi-interfering situation, the ISE's response can be expressed using equation (18). Nevertheless, it is complicated to calculate the desired ion's concentrations by solving the mathematical equation group. Actually, after the recalibration, the parameters in equation (18) have been settled and optimized, which are considered as constant values. Therefore, to predict the concentrations for the unknown samples, the concentrations of the four cations were considered as the parameters in equation (18) for each ISE, and GA can be applied for adjusting these parameters so that the concentrations can be predicted.

Similar as the parameter optimization mentioned before, the concentrations of the four ions were encoded into one chromosome (vector), 40 chromosomes (vectors) were initialized with four unit norm random values and converted into decimal integers (0 to 1000). Then these decimal integers were converted into ten digit binary numbers. Every vector, which has four values representing four parameters, will therefore contain forty digit binary numbers that represent one chromosome. The fitness function was based on equation (18) for the ISE array. The fewer errors in the calculated values against the real measurement values, the better fitness of the chromosome. For the fitness function, for each chromosome, firstly, the four binary numbers were converted back to decimal integers and scaled to the ranges as 0 to 5 for the concentrations, since pC=−lg M, respectively. The fitness value of each chromosome was calculated and checked in each GA generation and the algorithm continued until a proper chromosome was found, whose fitness value satisfied the accuracy (with the sum of absolute errors less than 0.1) or terminated when the maximum number of generations (set at 1000) was reached. For offspring, the parents were selected using Stochastic Universal Sampling, recombined by multi-point crossover and mutating each element with an initial probability (p=0.7). 20 synthetic samples with random concentrations of four cations were employed as for testing.

Alternatively, it is possible to build up a BPNN using simulated data based on the equation group and predict the unknown concentrations. By using OED, 16 combinations of the four cations with three concentration levels (1.0, 10 and 100 mmol/L for Na, 0.1, 1.0 and 10 mmol/L for the other cations) were used to simulate the potential response values from ISE array. The simulated results were applied for training the BPNN model. For each time of recalibration, based on the selected standard solutions as mentioned previously, the mathematical model for the ISE's response characters was built up and the 16 training values for BPNN simulated. Hence, for recalibration, instead of using real measured data, the BPNN with the decided structure would be re-trained using the 16 simulated data point.

The architecture of the BPNN model for determination was 4 by N by 4: one input layer with four neurons (one ISE each); one hidden layer whereby the number of hidden neurons was determined by optimization; and one output layer with four output neurons, corresponding to the predicted concentrations of the four cations, respectively. To optimize the performance of the BPNN, the training parameters were set to a maximum of 300 epochs, with a fixed error goal for the training subset of 0.001 of the Root Mean Square Error (RMSE). The robustness and appropriateness of the approach was assessed using the mean of the Relative Error (MRE) of the testing set (20 synthetic samples), between the predicted and the known concentrations. All neuron numbers of the hidden layer from 2 to 12 were parallel trained and their performance was compared. While there are several potential training algorithms which use the BPNN model in Matlab™, no one algorithm is best suited to all applications. Therefore, the performances of three transfer functions: linear, tangent sigmoid and log sigmoid; and five training functions: Bayesian regulation back-propagation, conjugate gradient back-propagation, gradient descent back-propagation, Levenberg-Marquardt back-propagation and scaled conjugate gradient back-propagation, were also compared. After optimization, the architecture of the BPNN model was set at 4 by 12 by 4 to simultaneously determine the four cations. The tangent sigmoid transfer function was used for the hidden layer. The linear transfer function was employed as the output function for the output layer. The weights and biases of the BPNN were randomly initialized before applying the Bayesian Regulation back-propagation training function.

Figure 11:
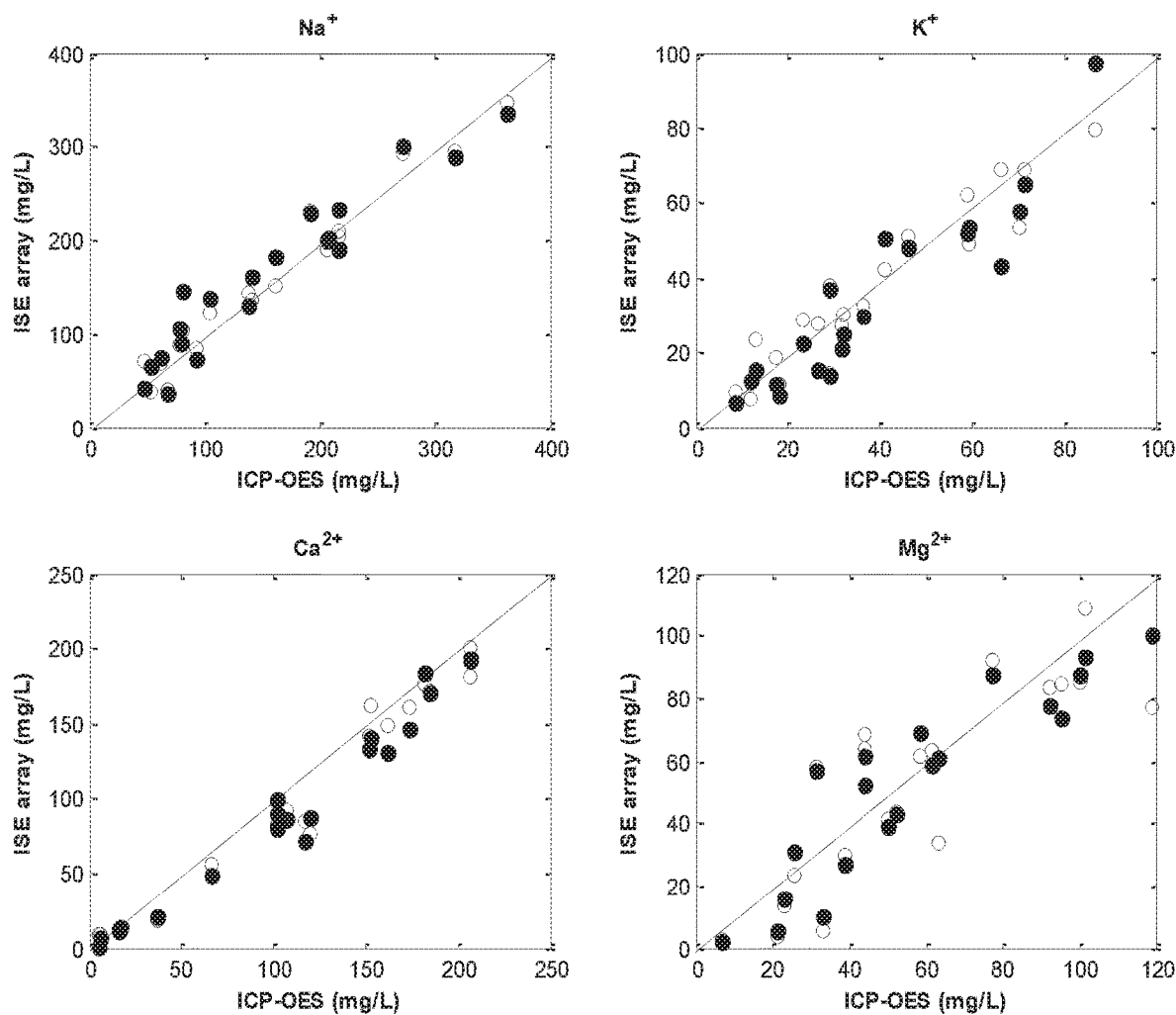
FIG. 11 shows further calibration and recalibration results of the device, according to an embodiment of the invention.
Figure 12:
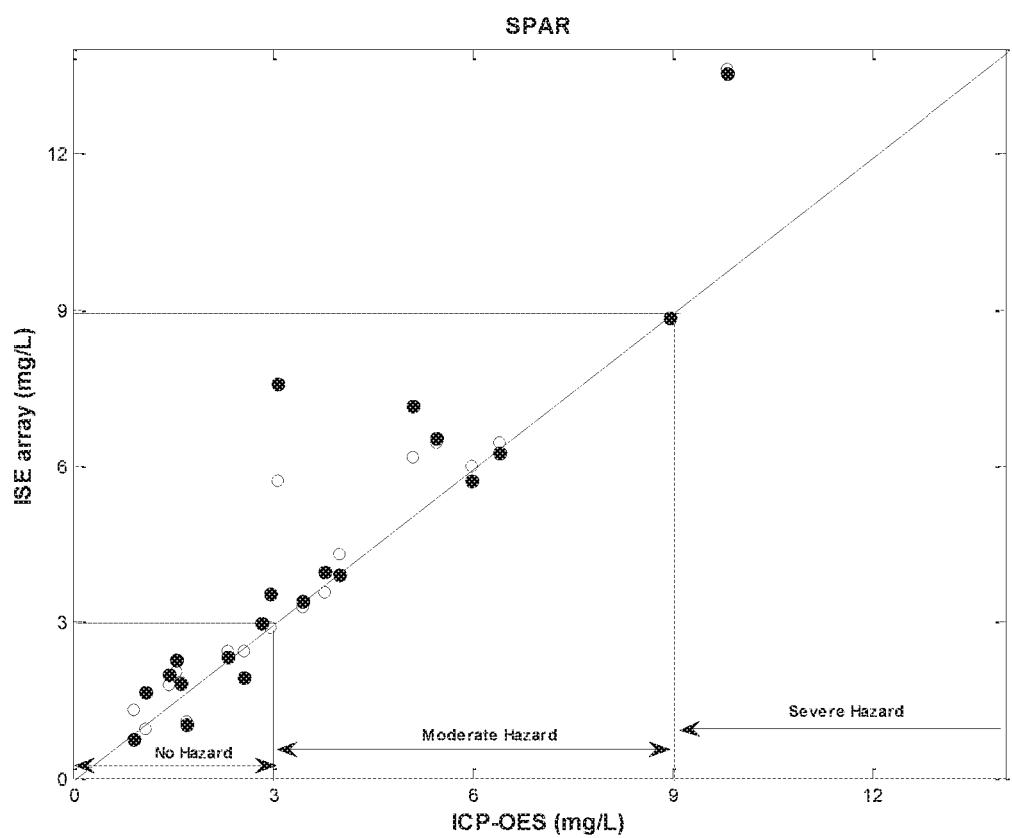
FIG. 12 shows further calibration and recalibration results of the device, according to an embodiment of the invention.

To validate the system described with respect to this embodiment, twenty real irrigation water samples, including underground water, surface water and reserve water, were collected from different vinery areas in South Australia, including Barossa Valley, McLaren Vale and Adelaide Hills. The samples were collected using standard water sampling procedures, and these solutions were delivered to the laboratory and analysed in 24 hours. During their transfer to the laboratory, these samples were covered with ice and kept in a sealed container. The prediction results by ISE array were compared to ICP-OES. Each sample was measured in triplicate by ISE array and duplicate by the ICP-OES and the average values were recorded. For comparison, two prediction methods were applied: GA optimization with using equation (18) for the ISEs; and BPNN built-up and trained using simulated data. The prediction results were compared to ICP-OES for the four exchangeable cations and shown in FIG. 11. It can be seen that the best prediction was belong to Ca and Na. This is because the Ca ISE has less interfering impact from other cations in overall; the concentrations of Na in the solutions were relatively higher than other interfering cations, and the interfering impact to Na ISE were negligible. The prediction accuracies for K and Mg were relatively weak, this is because the K ISE was severe interfered by Na ion; and Mg ISE is sensitive to Ca ion. Compared to the 1:1 line, it is clearly evident that Na and K were closer to 1:1 rather than Ca and Mg, which were underneath. One of the possible reason is that ICP-OES calculates the total ion concentrations including free ions and their complex species, but ISEs are responsive to ion activities only. Meanwhile, it is illustrated from the figure that there were no significant difference between the prediction results using GA or BPNN for the four exchangeable cations, since both were employed the same recalibration procedures. Furthermore, the SPAR values were also calculated based on the predicted results and illustrated in FIG. 12. With the reasonable prediction accuracy for Na and Ca, which are the dominated monovalent cations and bivalent cations, respectively, the predicted SPAR values were close to the 1:1 line against to the results from ICP-OES. Since most of the prediction results for Ca and Mg were lower than ICP-OES, it was expected some of the predicted SPAR values were higher than ICP-OES. It can be seen in FIG. 12 that most of the water samples have no or moderate sodicity hazard, and amendments should be applied before it can be used for irrigation.

Those skilled in the art will appreciate that the invention described herein is susceptible to variations and modifications other than those specifically described. It is to be understood that the invention includes all such variations and modifications.

The invention claimed is:

1. A method of recalibrating a device for assessing concentration of at least one analyte ion in a liquid, the device having: a plurality of ion selective electrodes (ISEs) each of which generate a signal in response to sensing a selected ion in the liquid; and a data processing unit implementing a neural network algorithm that has been trained to calculate ion interference between the selected ion and other ions in the liquid sensed at one of the electrodes and/or electrode interference between ones of the electrodes sensing a same selected ion based on a result of a comparison of training data indicative of known ionic concentrations applied to the neural network algorithm and the known ionic concentrations, the method includes:

contacting, with the plurality of electrodes, more than one recalibrating sample having n selected calibration ions and a plurality of interference calibration ions of known ionic concentrations, respectively, whereby each of the n selected calibration ions correspond to ones of the plurality of electrodes; and the data processing unit:

receiving a signal from each of the electrodes in response to sensing an ionic concentration of a corresponding one of the n selected calibration ions and the plurality of interference calibration ions in the more than one recalibrating sample;

simulating a response of each of the plurality of electrodes by applying the signal as recalibration training data to a recalibration algorithm that has been trained to simulate the response based on a comparison of the recalibration training data and the known ionic concentration of the n selected calibration ions and the plurality of interference calibration ions, wherein stimulating the response of each of the plurality of electrodes is expressed as:

$$V_{ISE} = V_{pC_{Selected}} + \sum_{i=1}^{n} \Delta V_{pC_{Selected} - pC_{Interferon_i}}$$

$$V_{ISE} \approx a \times pC_{Selected} + b + \sum_{i=1}^{n} c_i \times e^{d_i \times (pC_{Selected} - pC_{Interferon_i})}$$

wherein:

$V_{ISE}$ is potential response value of the first electrode (ISE) (Unit: mV);

$VpC_{Selected}$ is potential value caused by the first selected calibration ion (Unit: mV);

$\Delta V$ is potential difference of each one of the plurality of electrodes ISE's response caused by each of the plurality of interference calibration ions (Unit: mV);

$pC_{Selected}$ is concentration of the first selected calibration ion (Unit: -lg M);

$pC_{Interferon_i}$ is concentration of the $i^{th}$ one of the interference calibration ions (Unit: -lg M); and a, b, $c_i$ and $d_i$ are parameters for the $i^{th}$ one of the interference calibration ions to be determined; and recalibrating the device by determining and optimizing the parameters a, b, $c_i$, and $d_i$ based on the known ionic concentrations of the n selected calibration ions and the plurality of interference calibration ions in the more than one recalibration sample.

2. A method of claim 1, further including simulating the response of a first electrode in the plurality of electrodes by simulating a first selected calibration ion potential response value of the first electrode caused by the first selected calibration ion and simulating a first interference calibration ion potential response difference value of the first electrode caused by the plurality of interference calibration ions.

3. A method of claim 2, wherein simulating the first selected calibration ion potential response value includes determining a concentration of the first selected calibration ion in the more than one recalibration sample, and simulating the first interference calibration ion potential response value includes determining a concentration of each of the plurality of interference calibration ions in the more than one recalibration sample.

4. A method of claim 3, further including simulating the response of a second electrode in the plurality of electrodes by simulating a second selected calibration ion potential response value of the second electrode caused by the second calibration ion and simulating a second interference calibration ion potential response difference value of the second electrode caused by the plurality of interference calibration ions.

5. A method of claim 4, wherein simulating the second selected calibration ion potential response value includes determining a concentration of the second selected calibration ion in the more than one recalibration sample, and simulating the second interference calibration ion potential response value includes determining a concentration of the plurality of interference calibration ions in the more than one recalibration sample.

6. A method of claim 5, wherein simulating the first and the second selected calibration ion potential response value and simulating the first and the second interference calibration ion potential response value includes determining said concentration of the first and the second selected calibration ion and said concentration of the plurality of interference calibration ions in five of said recalibration samples, respectively.

7. A method of claim 1, wherein then selected calibration ions of known ionic concentration are four selected calibration ions which correspond to four of the plurality of electrodes.

8. A method of claim 7, wherein the plurality of interference calibration ions includes the four selected calibration ions.

9. A method of claim 1, further including the recalibration algorithm determining and optimising the parameters a, b, $c_i$ and $d_i$ based on the known ionic concentrations of the n selected calibration ions and the plurality of interference calibration ions in the more than one recalibration sample.

10. A method of claim 9, wherein the parameters a and b are determined based on various ionic concentrations of the n selected calibration ions and the plurality of interference ions in the more than one recalibration sample, respectively, and the parameters $c_i$ and $d_i$ are determined based on various ionic concentrations of the plurality of interference ions in the more than one recalibration sample with constant ionic concentrations of the n selected calibration ions, respectively.

11. The method of claim 1, wherein the calibration ions comprise sodium, potassium, calcium, and magnesium.

* * * * *